United States Patent
Ledenev et al.

(10) Patent No.: US 8,004,116 B2
(45) Date of Patent: *Aug. 23, 2011

(54) HIGHLY EFFICIENT SOLAR POWER SYSTEMS

(75) Inventors: Anatoli Ledenev, Fort Collins, CO (US); Robert M. Porter, Wellington, CO (US)

(73) Assignee: AMPT, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/955,704

(22) Filed: Nov. 29, 2010

(65) Prior Publication Data

US 2011/0067745 A1    Mar. 24, 2011

Related U.S. Application Data

(63) Continuation of application No. 12/682,889, filed as application No. PCT/US2008/057105 on Mar. 14, 2008, now Pat. No. 7,843,085.

(60) Provisional application No. 60/980,157, filed on Oct. 15, 2007, provisional application No. 60/982,053, filed on Oct. 23, 2007, provisional application No. 60/986,979, filed on Nov. 9, 2007.

(51) Int. Cl.
*H02J 1/12* (2006.01)

(52) U.S. Cl. ............................................. 307/80

(58) Field of Classification Search .................... 307/80; 136/244; 250/200; 60/641.5, 641.8; 320/101
See application file for complete search history.

(56) References Cited

U.S. PATENT DOCUMENTS

| | | | |
|---|---|---|---|
| 3,900,943 A | 8/1975 | Sirti et al. | |
| 4,127,797 A | 11/1978 | Perper | |
| 4,168,124 A | 9/1979 | Pizzi | |
| 4,218,139 A | 8/1980 | Sheffield | |
| 4,222,665 A | 9/1980 | Tachizawa et al. | |
| 4,249,958 A | 2/1981 | Baudin et al. | |
| 4,274,044 A | 6/1981 | Barre | |
| 4,341,607 A | 7/1982 | Tison | |

(Continued)

FOREIGN PATENT DOCUMENTS

EP    0677749 A3    1/1996

(Continued)

OTHER PUBLICATIONS

U.S. Appl. No. 12/363,709; First Amended Accelerated Examination Support Document filed Jul. 15, 2009.

(Continued)

*Primary Examiner* — Albert W Paladini
(74) *Attorney, Agent, or Firm* — Santangelo Law Offices, P.C.

(57) ABSTRACT

Different systems to achieve solar power conversion are provided in at least three different general aspects, with circuitry that can be used to harvest maximum power from a solar source (1) or strings of panels (11) for DC or AC use, perhaps for transfer to a power grid (10) three aspects can exist perhaps independently and relate to: 1) electrical power conversion in a multimodal manner, 2) alternating between differing processes such as by an alternative mode photovoltaic power converter functionality control (27), and 3) systems that can achieve efficiencies in conversion that are extraordinarily high compared to traditional through substantially power isomorphic photovoltaic DC-DC power conversion capability that can achieve 99.2% efficiency or even only wire transmission losses. Switchmode impedance conversion circuits may have pairs of photovoltaic power series switch elements (24) and pairs of photovoltaic power shunt switch elements (25).

29 Claims, 10 Drawing Sheets

U.S. PATENT DOCUMENTS

| | | | |
|---|---|---|---|
| 4,375,662 A | 3/1983 | Baker |
| 4,390,940 A | 6/1983 | Corbefin et al. |
| 4,395,675 A | 7/1983 | Toumani |
| 4,404,472 A | 9/1983 | Steigerwald |
| 4,445,030 A | 4/1984 | Carlton |
| 4,445,049 A | 4/1984 | Steigerwald |
| 4,513,167 A | 4/1985 | Brandstetter |
| 4,528,503 A | 7/1985 | Cole |
| 4,580,090 A | 4/1986 | Bailey et al. |
| 4,581,716 A | 4/1986 | Kamiya |
| 4,619,863 A | 10/1986 | Taylor |
| 4,626,983 A | 12/1986 | Harada et al. |
| 4,649,334 A | 3/1987 | Nakajima |
| 4,725,740 A | 2/1988 | Nakata |
| 4,749,982 A | 6/1988 | Rikuna et al. |
| 4,794,909 A | 1/1989 | Elden |
| 4,873,480 A | 10/1989 | Lafferty |
| 4,896,034 A | 1/1990 | Kiriseko |
| 4,899,269 A | 2/1990 | Rouzies |
| 4,922,396 A | 5/1990 | Niggemeyer |
| 5,027,051 A | 6/1991 | Lafferty |
| 5,028,861 A | 7/1991 | Pace et al. |
| 5,179,508 A | 1/1993 | Lange et al. |
| 5,270,636 A | 12/1993 | Lafferty |
| 5,401,561 A | 3/1995 | Fisun et al. |
| 5,493,155 A | 2/1996 | Okamoto et al. |
| 5,493,204 A | 2/1996 | Caldwell |
| 5,503,260 A | 4/1996 | Riley |
| 5,646,502 A | 7/1997 | Johnson |
| 5,648,731 A | 7/1997 | Decker et al. |
| 5,659,465 A | 8/1997 | Flack et al. |
| 5,669,987 A | 9/1997 | Takehara et al. |
| 5,689,242 A | 11/1997 | Sims et al. |
| 5,741,370 A | 4/1998 | Hanoka |
| 5,747,967 A | 5/1998 | Muljadi et al. |
| 5,782,994 A | 7/1998 | Mori et al. |
| 5,801,519 A * | 9/1998 | Midya et al. ................. 323/222 |
| 5,896,281 A | 4/1999 | Bingley |
| 5,898,585 A | 4/1999 | Sirichote et al. |
| 5,923,100 A | 7/1999 | Lukens et al. |
| 5,932,994 A | 8/1999 | Jo et al. |
| 6,046,401 A | 4/2000 | McCabe |
| 6,081,104 A | 6/2000 | Kern |
| 6,124,769 A | 9/2000 | Igarashi et al. |
| 6,162,986 A | 12/2000 | Shiotsuka |
| 6,180,868 B1 | 1/2001 | Yoshino et al. |
| 6,181,590 B1 | 1/2001 | Yamane et al. |
| 6,191,501 B1 | 2/2001 | Bos |
| 6,218,605 B1 | 4/2001 | Daily et al. |
| 6,218,820 B1 | 4/2001 | D'Arrigo et al. |
| 6,219,623 B1 | 4/2001 | Wills |
| 6,262,558 B1 | 7/2001 | Weinberg |
| 6,278,052 B1 | 8/2001 | Takehara et al. |
| 6,281,485 B1 | 8/2001 | Siri |
| 6,282,104 B1 | 8/2001 | Kern |
| 6,314,007 B2 | 11/2001 | Johnson, Jr. et al. |
| 6,331,670 B2 | 12/2001 | Takehara et al. |
| 6,351,400 B1 | 2/2002 | Lumsden |
| 6,369,462 B1 | 4/2002 | Siri |
| 6,433,522 B1 | 8/2002 | Siri |
| 6,433,992 B2 | 8/2002 | Nakagawa et al. |
| 6,441,896 B1 | 8/2002 | Field |
| 6,448,489 B2 | 9/2002 | Kimura et al. |
| 6,493,246 B2 | 12/2002 | Suzui et al. |
| 6,515,215 B1 | 2/2003 | Mimura |
| 6,545,211 B1 | 4/2003 | Mimura |
| 6,545,868 B1 | 4/2003 | Kledzik et al. |
| 6,593,521 B2 | 7/2003 | Kobayashi |
| 6,624,350 B2 | 9/2003 | Nixon et al. |
| 6,670,721 B2 | 12/2003 | Lof et al. |
| 6,686,533 B2 | 2/2004 | Raum et al. |
| 6,686,727 B2 | 2/2004 | Ledenev et al. |
| 6,750,391 B2 | 6/2004 | Bower et al. |
| 6,791,024 B2 | 9/2004 | Toyomura |
| 6,804,127 B2 | 10/2004 | Zhou |
| 6,889,122 B2 | 5/2005 | Perez |
| 6,914,418 B2 | 7/2005 | Sung |
| 6,920,055 B1 | 7/2005 | Zeng et al. |
| 6,952,355 B2 | 10/2005 | Riggio et al. |
| 6,958,922 B2 | 10/2005 | Kazem |
| 6,984,965 B2 | 1/2006 | Vinciarelli |
| 6,984,970 B2 | 1/2006 | Capel |
| 7,019,988 B2 | 3/2006 | Fung et al. |
| 7,046,531 B2 | 5/2006 | Zocchi et al. |
| 7,068,017 B2 | 6/2006 | Willner et al. |
| 7,072,194 B2 | 7/2006 | Nayar et al. |
| 7,091,707 B2 | 8/2006 | Cutler |
| 7,092,265 B2 | 8/2006 | Kernahan |
| 7,158,395 B2 | 1/2007 | Deng et al. |
| 7,193,872 B2 | 3/2007 | Siri |
| 7,227,278 B2 | 6/2007 | Realmuto et al. |
| 7,248,946 B2 | 7/2007 | Bashaw et al. |
| 7,274,975 B2 | 9/2007 | Miller |
| 7,333,916 B2 | 2/2008 | Warfield et al. |
| 7,365,661 B2 | 4/2008 | Thomas |
| 7,471,073 B2 | 12/2008 | Rettenwort et al. |
| 7,479,774 B2 * | 1/2009 | Wai et al. ...................... 323/284 |
| 7,514,900 B2 | 4/2009 | Sander et al. |
| D602,432 S | 10/2009 | Moussa |
| 7,602,080 B1 | 10/2009 | Hadar et al. |
| 7,605,498 B2 | 10/2009 | Ledenev et al. |
| 7,619,200 B1 | 11/2009 | Seymour et al. |
| 7,663,342 B2 * | 2/2010 | Kimball et al. ................ 320/132 |
| 7,719,140 B2 | 5/2010 | Ledenev et al. |
| 7,768,155 B2 * | 8/2010 | Fornage ........................ 307/140 |
| 7,786,716 B2 | 8/2010 | Simburger et al. |
| 7,807,919 B2 | 10/2010 | Powell |
| 7,834,580 B2 * | 11/2010 | Haines ........................ 320/101 |
| 2001/0007522 A1 | 7/2001 | Nakagawa et al. |
| 2001/0032664 A1 | 10/2001 | Takehara et al. |
| 2003/0062078 A1 | 4/2003 | Mimura |
| 2003/0075211 A1 | 4/2003 | Makita et al. |
| 2004/0095020 A1 | 5/2004 | Kernahan et al. |
| 2004/0100149 A1 | 5/2004 | Lai |
| 2004/0135560 A1 | 7/2004 | Kernahan et al. |
| 2004/0159102 A1 | 8/2004 | Toyomura et al. |
| 2004/0164557 A1 | 8/2004 | West |
| 2004/0207366 A1 | 10/2004 | Sung |
| 2004/0211456 A1 | 10/2004 | Brown et al. |
| 2005/0002214 A1 | 1/2005 | Deng et al. |
| 2005/0068012 A1 | 3/2005 | Cutler |
| 2005/0105224 A1 | 5/2005 | Nishi |
| 2005/0109386 A1 | 5/2005 | Marshall |
| 2005/0121067 A1 | 6/2005 | Toyomura |
| 2005/0162018 A1 | 7/2005 | Realmuto et al. |
| 2005/0169018 A1 | 8/2005 | Hatai et al. |
| 2005/0254191 A1 | 11/2005 | Bashaw et al. |
| 2006/0017327 A1 | 1/2006 | Siri et al. |
| 2006/0103360 A9 | 5/2006 | Cutler |
| 2006/0162772 A1 | 7/2006 | Preser et al. |
| 2006/0171182 A1 | 8/2006 | Siri et al. |
| 2006/0174939 A1 | 8/2006 | Matan |
| 2007/0024257 A1 | 2/2007 | Boldo |
| 2007/0035975 A1 | 2/2007 | Dickerson et al. |
| 2007/0044837 A1 | 3/2007 | Simburger et al. |
| 2007/0069520 A1 | 3/2007 | Schetters |
| 2007/0111103 A1 | 5/2007 | Konishiike et al. |
| 2007/0119718 A1 | 5/2007 | Gibson et al. |
| 2007/0133241 A1 | 6/2007 | Mumtaz et al. |
| 2007/0159866 A1 | 7/2007 | Siri |
| 2007/0171680 A1 | 7/2007 | Perreault et al. |
| 2007/0236187 A1 | 10/2007 | Wai et al. |
| 2008/0036440 A1 | 2/2008 | Garmer |
| 2008/0062724 A1 | 3/2008 | Feng et al. |
| 2008/0097655 A1 | 4/2008 | Hadar et al. |
| 2008/0101101 A1 | 5/2008 | Iwata et al. |
| 2008/0111517 A1 | 5/2008 | Pfeifer et al. |
| 2008/0123375 A1 | 5/2008 | Beardsley |
| 2008/0136367 A1 | 6/2008 | Adest et al. |
| 2008/0143188 A1 | 6/2008 | Adest et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0186004 A1 | 8/2008 | Williams |
| 2008/0238195 A1 | 10/2008 | Shaver |
| 2008/0247201 A1 | 10/2008 | Perol |

| | | | | |
|---|---|---|---|---|
| 2008/0257397 A1 | 10/2008 | Glaser et al. | JP | 2007104872 A | 4/2007 |
| 2009/0039852 A1 | 2/2009 | Fishelov et al. | JP | 2007225625 A | 6/2007 |
| 2009/0078300 A1 | 3/2009 | Ang et al. | JP | 27058845 A | 8/2007 |
| 2009/0114263 A1 | 5/2009 | Powell et al. | JP | 2007058843 A | 8/2007 |
| 2009/0120485 A1 | 5/2009 | Kikinis | KR | 1020050071689 A | 7/2005 |
| 2009/0133736 A1 | 5/2009 | Powell et al. | KR | 1020060060825 A | 7/2006 |
| 2009/0140715 A1 | 6/2009 | Adest et al. | KR | 1020070036528 A9 | 3/2007 |
| 2009/0141522 A1 | 6/2009 | Adest et al. | KR | 1020080092747 A | 10/2008 |
| 2009/0145480 A1 | 6/2009 | Adest et al. | WO | 90/03680 | 4/1990 |
| 2009/0146505 A1 | 6/2009 | Powell et al. | WO | 9003680 A1 | 4/1990 |
| 2009/0146667 A1 | 6/2009 | Adest et al. | WO | 02073785 A1 | 9/2002 |
| 2009/0146671 A1 | 6/2009 | Gazit | WO | 03036688 A2 | 4/2003 |
| 2009/0147554 A1 | 6/2009 | Adest et al. | WO | 2004100344 A2 | 11/2004 |
| 2009/0150005 A1 | 6/2009 | Hadar et al. | WO | 2004100348 A1 | 11/2004 |
| 2009/0160258 A1 | 6/2009 | Allen et al. | WO | 2004107543 A1 | 12/2004 |
| 2009/0206666 A1 | 8/2009 | Sella et al. | WO | 2005027300 A2 | 3/2005 |
| 2009/0218887 A1 | 9/2009 | Ledenev et al. | WO | 2005036725 A1 | 4/2005 |
| 2009/0234692 A1 | 9/2009 | Powell et al. | WO | 2005076445 A1 | 8/2005 |
| 2009/0237042 A1 | 9/2009 | Glovinski | WO | 2006005125 A1 | 1/2006 |
| 2009/0273241 A1 | 11/2009 | Gazit et al. | WO | 2006013600 A2 | 2/2006 |
| 2009/0283128 A1 | 11/2009 | Zhang et al. | WO | 2006013600 A3 | 2/2006 |
| 2009/0283129 A1 | 11/2009 | Foss | WO | 2006048688 A1 | 5/2006 |
| 2009/0284078 A1 | 11/2009 | Zhang et al. | WO | 2006048689 A2 | 5/2006 |
| 2009/0284232 A1 | 11/2009 | Zhang et al. | WO | 2006048689 A3 | 5/2006 |
| 2009/0284240 A1 | 11/2009 | Zhang et al. | WO | 2006071436 A2 | 7/2006 |
| 2009/0284998 A1 | 11/2009 | Zhang et al. | WO | 2006078685 A2 | 7/2006 |
| 2010/0001587 A1 | 1/2010 | Casey et al. | WO | 2006090675 | 8/2006 |
| 2010/0026097 A1 | 2/2010 | Avrutsky et al. | WO | 2006117551 A2 | 11/2006 |
| 2010/0027297 A1 | 2/2010 | Avrutsky et al. | WO | 2006137948 A2 | 12/2006 |
| 2010/0117858 A1 | 5/2010 | Rozenboim | WO | 2007007360 A2 | 1/2007 |
| 2010/0118985 A1 | 5/2010 | Rozenboim | WO | 200708429 A2 | 7/2007 |
| 2010/0127570 A1 | 5/2010 | Hadar et al. | WO | 2007080429 A2 | 7/2007 |
| 2010/0127571 A1 | 5/2010 | Hadar et al. | WO | 2007142693 A3 | 12/2007 |
| 2010/0132758 A1 | 6/2010 | Gilmore | WO | 2008125915 A2 | 10/2008 |
| 2010/0139732 A1 | 6/2010 | Hadar et al. | WO | 2008125915 A3 | 10/2008 |
| 2010/0139734 A1 | 6/2010 | Hadar et al. | WO | 2008132551 A2 | 11/2008 |
| 2010/0139743 A1 | 6/2010 | Hadar et al. | WO | 2008132551 A3 | 11/2008 |
| 2010/0195361 A1 | 8/2010 | Stem | WO | 2008132553 A2 | 11/2008 |
| 2010/0229915 A1 | 9/2010 | Ledenev | WO | 2008142480 A2 | 11/2008 |
| 2010/0246230 A1 | 9/2010 | Porter | WO | 2008142480 A3 | 11/2008 |
| 2010/0253150 A1 | 10/2010 | Ledenev et al. | WO | 2008142480 A4 | 11/2008 |
| 2010/0308662 A1 | 12/2010 | Schatz et al. | WO | 2008069926 A3 | 12/2008 |
| FOREIGN PATENT DOCUMENTS | | | WO | 2009007782 A2 | 1/2009 |
| | | | WO | 2009007782 A3 | 1/2009 |
| EP | 0677749 A2 | 10/1996 | WO | 2009007782 A4 | 1/2009 |
| EP | 0824273 A2 | 2/1998 | WO | 2009051853 A1 | 4/2009 |
| EP | 0964415 A1 | 12/1999 | WO | 2009051854 A1 | 4/2009 |
| EP | 0964457 A2 | 12/1999 | WO | 2009051870 A1 | 4/2009 |
| EP | 0964457 A3 | 12/1999 | WO | 2009055474 A1 | 4/2009 |
| EP | 00978884 A3 | 3/2000 | WO | 2009059028 A2 | 5/2009 |
| EP | 0780750 B1 | 3/2002 | WO | 2009059028 A3 | 5/2009 |
| EP | 1120895 A3 | 5/2004 | WO | 2009064683 A2 | 5/2009 |
| FR | 612859 | 11/1948 | WO | 2009064683 A3 | 5/2009 |
| GB | 310362 | 9/1929 | WO | 2009072075 A2 | 6/2009 |
| GB | 1231961 | 9/1969 | WO | 2009072075 A3 | 6/2009 |
| GB | 5050197 | 11/2005 | WO | 2009072075 A9 | 6/2009 |
| GB | 2415841 A | 1/2006 | WO | 2009072076 A2 | 6/2009 |
| GB | 2419968 A | 5/2006 | WO | 2009072076 A3 | 6/2009 |
| GB | 2421847 A | 7/2006 | WO | 2009072077 A1 | 6/2009 |
| GB | 2434490 A | 7/2007 | WO | 2009073867 A1 | 6/2009 |
| JP | 56042365 A2 | 4/1981 | WO | 2009073868 A1 | 6/2009 |
| JP | 60027964 A2 | 2/1985 | WO | 2009075985 A2 | 6/2009 |
| JP | 60148172 A2 | 8/1985 | WO | 2009075985 A3 | 6/2009 |
| JP | 62154121 A2 | 9/1987 | WO | 2009114341 A2 | 9/2009 |
| JP | 05003678 A2 | 1/1993 | WO | 2009114341 A3 | 9/2009 |
| JP | 06035555 A2 | 2/1994 | WO | 2009118682 A2 | 10/2009 |
| JP | 06141261 A2 | 5/1994 | WO | 2009118682 A3 | 10/2009 |
| JP | 07026849 U2 | 1/1995 | WO | 2009118682 A4 | 10/2009 |
| JP | 07222436 A2 | 8/1995 | WO | 2009118683 A2 | 10/2009 |
| JP | 08033347 A2 | 2/1996 | WO | 2009118683 A3 | 10/2009 |
| JP | 08066050 A2 | 3/1996 | WO | 2009118683 A4 | 10/2009 |
| JP | 08181343 A2 | 7/1996 | WO | 2009136358 A1 | 11/2009 |
| JP | 08204220 A2 | 8/1996 | WO | 2009136358 A4 | 11/2009 |
| JP | 09097918 A2 | 4/1997 | WO | 2009140536 A2 | 11/2009 |
| JP | 9148613 A2 | 6/1997 | WO | 2009140536 A3 | 11/2009 |
| JP | 2000020150 A2 | 1/2000 | WO | 2009140539 A2 | 11/2009 |
| JP | 20011086765 A | 3/2001 | WO | 2009140539 A3 | 11/2009 |
| JP | 2002231578 A | 8/2002 | WO | 2009140543 A2 | 11/2009 |
| JP | 2002231578 A2 | 8/2002 | WO | 2009140543 A3 | 11/2009 |

| | | | |
|---|---|---|---|
| WO | 2009140551 A2 | 11/2009 |
| WO | 2009140551 A3 | 11/2009 |
| WO | 2010002960 A1 | 1/2010 |
| WO | 2010014116 A1 | 2/2010 |
| WO | 2010062410 A1 | 6/2010 |
| WO | 2010062662 A2 | 6/2010 |
| WO | 2010062662 A3 | 6/2010 |
| WO | 2010065043 A1 | 6/2010 |
| WO | 2010120315 A1 | 10/2010 |

OTHER PUBLICATIONS

U.S. Appl. No. 12/363,709, Accelerated Examination Support Document filed Jan. 30, 2009.
Parallel U.S. Appl. No. 12/682,882; Nonfinal Office Action dated Sep. 27, 2010.
Parallel U.S. Appl. No. 12/682,882; Examiner's Interview Summary dated Oct. 20, 2010; mailed Oct. 26, 2010.
Parallel U.S. Appl. No. 12/738,068; Examiner's Interview Summary dated Oct. 20, 2010.
Parallel U.S. Appl. No. 12/738,068; Nonfinal Office Action dated Oct. 24, 2010.
(Parent Application to this Continuation) U.S. Appl. No. 12/682,889, filed Apr. 13, 2010, First Named Inventor Anatoli Ledenev.
http://www.solarsentry.com; Protecting Your Solar Investment, 2005, Solar Sentry Corp.
Bower, et al. "Innovative PV Micro-Inverter Topology Eliminates Electrolytic Capacitors for Longer Lifetime," 1-4244-0016-3-06 IEEE p. 2038.
Solar Sentry Corp., Protecting Solar Investment "Solar Sentry's Competitive Advantage", 4 pages estimated as Oct. 2008.
Dallas Semiconductor; Battery I.D. chip from Dallas Semiconductor monitors and reports battery pack temperature, Bnet World Network, Jul. 10, 1995.
deHaan, S.W.H., et al; Test results of a 130W AC module, a modular solar AC power station, Photovoltaic Energy Conversion, 1994; Conference Record of the 24th IEEE Photovoltaic Specialists Conference Dec. 5-9, 1994; 1994 IEEE First World Conference, vol. 1, pp. 925-928.
European patent application No. 1999111425 filed Nov. 6, 1999; and various office actions.
Gomez, M; "Consulting in the solar power age," IEEE-CNSV: Consultants' Network of Silicon Valley, Nov. 13, 2007.
Guo, G.Z.; "Design of a 400W, 1 Omega, Buck-boost Inverter for PV Applications," 32nd Annual Canadian Solar Energy Conference, Jun. 10, 2007.
Wang, Ucilia; Greentechmedia; "National semi casts solarmagic;" www.greentechmedia.com; Jul. 2, 2008.
Kroposki, H. Thomas and Witt, B & C; "Progress in Photovoltaic Components and Systems," National Renewable Energy Laboratory, May 1, 2000; NREL-CP-520-27460.
Hashimoto et al; "A Novel High Performance Utility Interactive Photovoltaic Inverter System," Department of Electrical Engineering, Tokyo Metropolitan University, 1-1 Miinami-Osawa, Hachioji, Tokyo, 192-0397, Japan; p. 2255, Aug. 6, 2002.
Hua, C et al; "Control of DC-DC Converters for Solar energy System with Maximum Power Tracking," Department of Electrical Engineering; National Yumin University of Science & Technology, Taiwan; vol. 2, Nov. 9-14, 1997; pp. 827-832.
Kern, G; "SunSine (TM)300: Manufacture of an AC Photovoltaic Module," Final Report, Phases I & II, Jul. 25, 1995-Jun. 30, 1998; National Renewable Energy Laboratory, Mar. 1999; NREL-SR-520-26085.
Kang, F et al; Photovoltaic Power Interface Circuit Incorporated with a Buck-boost Converter and a Full-bridge Inverter; doi:10.1016-j.apenergy.2004.10.009.
Kretschmar, K et al; "An AC Converter with a Small DC Link Capacitor for a 15kW Permanent Magnet Synchronous Integral Motor,Power Electronics and Variable Speed Drive," 1998;7th International Conference; Conf. Publ. No. 456; Sep. 21-23, 1998; pp. 622-625.
Lim, Y.H. et al; "Simple Maximum Power Point Tracker for Photovoltaic Arrays," Electronics Letters May 25, 2000; vol. 36, No. 11.
Linear Technology Specification Sheet, LTM4607, estimated as Nov. 14, 2007.
Matsuo, H et al; Novel Solar Cell Power Supply System using the Multiple-input DC-DC Converter; Telecommunications Energy Conference, 1998; INTELEC, 20th International, pp. 797-8022.
solar-electric.com; Northern Arizona Wind & Sun, All About MPPT Solar Charge Controllers; Nov. 5, 2007.
Oldenkamp, H. et al; AC Modules: Past, Present and Future, Workshop Installing the Solar Solution; pp. 22-23; Jan. 1998; Hatfield, UK.
U.S. Appl. No. 11/333,005, filed Jan. 17, 2006, First Named Inventor Gordon E. Presher, Jr.
Rodriguez, C; "Analytic Solution to the Photovoltaic Maximum Power Point Problem;" IEEE Transactions of Power Electronics, vol. 54, No. 9, Sep. 2007.
De Doncker, R. W.; "Power Converter for PV-Systems," Institute for Power Electrical Drives, RWTH Aachen Univ. Feb. 6, 2006.
Roman, E et al; "Intelligent PV Module for Grid-Connected PV Systems;" IEEE Transactions of Power Electronics, vol. 53, No. 4, Aug. 2006.
Russell, M.C. et al; "The Massachusetts Electric Solar Project: A Pilot Project to Commercialize Residential PC Systems," Photovoltaic Specialists Conference 2000; Conference Record of the 28th IEEE; pp. 1583-1586.
SatCon Power Systems, PowerGate Photovoltaic 50kW Power Converter System; Spec Sheet; Jun. 2004.
Schekulin, Dirk et al; "Module-integratable Inverters in the Power-Range of 100-400 Watts," 13th European Photovoltaic Solar Energy Conference, Oct. 23-27, 1995; Nice, France; p. 1893-1896.
Shimizu, et al; "Generation Control Circuit for Photovoltaic Modules," IEEE Transactions on Power Electronics; vol. 16, No. 3, May 2001.
Takahashi, I. et al; "Development of a Long-life Three-phase Flywheel UPS Using an Electrolytic Capacitorless Converter-inverter," 1999 Scripta Technica, Electr. Eng. Jpn, 127(3); 25-32.
Walker, G.R. et al; "Cascaded DC-DC Converter Connection of Photovoltaic Modules," IEEE Transactions of Power Electronics, vol. 19, No. 4, Jul. 2004.
Walker, G.R. et al; "PV String Per-Module Power Point Enabling Converters," School of Information Technology and Electrical Engineering; The University of Queensland, presented at the Australasian Universities Power Engineering Conference, Sep. 28-Oct. 1, 2003 in Christchurch; AUPEC2003.
Cambridge Consultants, Interface Issue 43, Autumn 2007.
U.S. Appl. No. 60/980,157, filed Oct. 15, 2007.
U.S. Appl. No. 60/982,053, filed Oct. 23, 2007.
U.S. Appl. No. 60/986,979, filed Nov. 15, 2007.
U.S. Appl. No. 60/868,851, filed Dec. 6, 2006.
U.S. Appl. No. 60/868,893, filed Dec. 6, 2006.
U.S. Appl. No. 60/868,962, filed Dec. 7, 2006.
U.S. Appl. No. 60/908,095, filed Mar. 26, 2007.
U.S. Appl. No. 60/916,815, filed May 9, 2007.
U.S. Appl. No. 12/340,540, filed Dec. 19, 2008, First Named Inventor Mordechay Avrutski.
U.S. Appl. No. 12/357,357, filed Jan. 21, 2009, First Named Inventor Earl G. Powell.
U.S. Appl. No. 12/392,042, filed Feb. 24, 2009, First Named Inventor Ron Hadar.
U.S. Appl. No. 12/467,117, filed May 15, 2009, First Named Inventor Leonid Rozenboim.
U.S. Appl. No. 12/542,632, filed Aug. 17, 2009, First Named Inventor Ron Hadar.
U.S. Appl. No. 12/567,169, filed Sep. 25, 2009, First Named Inventor Ron Hadar.
U.S. Appl. No. 12/628,977, filed Dec. 1, 2009, First Named Inventor Ron Hadar.
U.S. Appl. No. 12/628,997, filed Dec. 1, 2009, First Named Inventor Ron Hadar.
U.S. Appl. No. 12/202,110, filed Aug. 29, 2008, First Named Inventor Mordechay Avrutski.
U.S. Appl. No. 12/467,116, filed May 15, 2009, First Named Inventor Leonid Rozenboim.

U.S. Appl. No. 12/506,929, filed Jul. 21, 2009, First Named Inventor Ron Hadar.
U.S. Appl. No. 11/950,224, filed Dec. 4, 2007, First Named Inventor Meir Adest.
U.S. Appl. No. 11/950,271, filed Dec. 4, 2007, First Named Inventor Meir Adest.
U.S. Appl. No. 11/950,307, filed Dec. 4, 2007, First Named Inventor Meir Adest.
U.S. Appl. No. 11/951,419, filed Dec. 4, 2007, First Named Inventor Meir Adest.
U.S. Appl. No. 11/951,485, filed Dec. 6, 2007, First Named Inventor Meir Adest.
U.S. Appl. No. 11/951,562, filed Dec. 6, 2007, First Named Inventor Meir Adest.
U.S. Appl. No. 12/314,113, filed Dec. 4, 2008, First Named Inventor Meir Adest.
U.S. Appl. No. 12/314,115, filed Dec. 4, 2008, First Named Inventor Meir Adest.
U.S. Appl. No. 12/328,742, filed Dec. 4, 2008, First Named Inventor Meir Adest.
U.S. Appl. No. 12/329,520, filed Dec. 5, 2008, First Named Inventor Meir Adest.
U.S. Appl. No. 12/411,294, filed Mar. 25, 2009, First Named Inventor Guy Sella.
U.S. Appl. No. 12/435,549, filed May 5, 2009, First Named Inventor Meir Gazit.
U.S. Appl. No. 12/409,763, filed Mar. 24, 2009, First Named Inventor Tzachi Glovinsky.
U.S. Appl. No. 12/409,604, filed Mar. 24, 2009, First Named Inventor Tzachi Glovinsky.
U.S. Appl. No. 12/329,525, filed Dec. 5, 2008, First Named Inventor Meir Adest.
U.S. Appl. No. 12/314,114, filed Dec. 4, 2008, First Named Inventor Meir Gzait.
U.S. Appl. No. 12/187,335, filed Aug. 6, 2008, First Named Inventor Amir Fishelov.
U.S. Appl. No. 12/338,610, filed Dec. 18, 2008, First Named Inventor James Allen.
U.S. Appl. No. 12/495,840, filed Jul. 1, 2009, First Named Inventor Leo Francis Casey.
U.S. Appl. No. 12/738,068, filed Apr. 14, 2010, First Named Inventor Robert M. Porter.
U.S. Appl. No. 12/682,882, filed Apr. 13, 2010, First Named Inventor Robert M. Porter.
U.S. Appl. No. 12/682,559, filed Apr. 9, 2010, First Named Inventor Douglas S. Schatz.
Linares, L., et al., Improved Energy Capture in Series String Photovoltaics via Smart Distributed Power Electronics; Proceedings APEC 2009: 24th Annual IEEE Applied Power Electronics Conference, Washington, D.C., Feb. 2009.
Knaupp, W. et al., Operation of a 10 kW PV facade with 100 W AC photovoltaic modules, 25th PVSC; May 13-17, 1996; Washington D.C.
Schoen, T.J.N., BIPV overview & getting PV into the marketplace in the Netherlands, The 2nd World Solar Electric Buildings Conference: Sydney Mar. 8-10, 2000.
Stern M., et al., Development of a Low-Cost Integrated 20-kW-AC Solar Tracking Subarray for Gid-Connected PV Power System Application—Final Report, National Renewable Energy Laboratory, Jun. 1998.
Verhoeve, C.W.G., et al., Recent Test Results of AC-Module inverters, Netherlands Energy Research Foundation ECN, 1997.
Roman, E., et al. Experimental results of controlled PV Module for building integrated PV systems; Science Direct; Solar Energy, vol. 82, Issue 5, May 2008, pp. 471-480.
International Application No. PCT/US08/57105, International Preliminary Report on Patentability, mailed Mar. 12, 2010.
International Application No. PCT/US09/41044, Search Report dated Jun. 5, 2009.
International Application No. PCT/US09/41044, Written Opinion dated Jun. 5, 2009.
International Application No. PCT/US08/79605, Search Report dated Feb. 3, 20009.
International Application No. PCT/US08/79605, Written Opinion dated Feb. 3, 20009.
International Application No. PCT/US08/80794, Search Report dated Feb. 23, 2009.
International Application No. PCT/US08/80794, Written Opinion dated Feb. 23, 2009.
Edelmoser, K. H. et al.; High Efficiency DC-to-AC Power Inverter with Special DC Interface; Professional Paper, ISSN 0005-1144, Automatika 46 (2005) 3-4, 143-148.
Esmaili, Gholamreza; Application of Advanced Power Electronics in Renewable Energy Sources and Hygrid Generating Systems, Ohio State University, Graduate Program in Electrical and Computer Engineering, 2006, Dissertation.
Jung, D; Soft Switching Boost Converter for Photovoltaic Power Generation System, 2008 13th International Power Electronics and Motion Control Conference (EPE-PEMC 2008).
Joo, Hyuk Lee; "Soft Switching Multi-Phase Boost Converter for Photovoltaic System," Power Electronics and Motion Control Conference, Sep. 1, 2008. EPE-PEMC 2008. 13th.
Kuo, J.-L.; "Duty-based Control of Maximum Power Point Regulation for Power Converter in Solar Fan System with Battery Storage," Proceedings of the Third IASTED Asian Conference, Apr. 2, 2007, Phuket, Thialand.
Enslin, J.H.R.; "Integrated Photovoltaic Maximum Power Point Tracking Converter;" Industrial Electronics, IEEE Transactions on vol. 44, Issue 6, Dec. 1997, pp. 769-773.
Dehbonei, Hooman; Corp author(s): Curtin University of Technology, School of Electrical and Computer Engineering; 2003; Description: xxi, 284 leaves; ill.; 31 cm. Dissertation: Thesis. Abstract.
Duncan, Joseph, A Global Maximum Power Point Tracking DC-DC Converter, Massachussetts Institute of Technology, Dept. of Electrical Engineering and Computer Science Dissertation; Jan. 20, 2005.
Enrique, J.M.; Duran, E; Sidrach-de-Cadona, M; Andujar, JM; "Theoretical Assessment of the Maximum Power Point Tracking Efficiency of Photovoltaic Facilities with Different Converter Topologies;" Source: Solar Energy 81, No. 1 (2007); 31 (8 pages).
Association for Applied Solar Energy, Alt. Journal; Uniform Title: Solar energy (Photnix, AZ); Key Title: Solar energy; Preceding Title: Journal of solar energy, science and engineering; Standard No: ISSN: 0038-092X CODEC: SRENA4. No abstract available.
Chung, H.S.H.; Hui Tse, K.K.; "A Novel Maximum Power Point Tracking Technique for PV Panels;" Dept. of Electronic Engineering, City Univerisity of Hong Kong; Source: PESC Record—IEEE Annual Power Electronics Specialists Conference, v 4, 2001, p. 1970-1975, Jun. 17-21, 2001; Abstract.
Mutoh, Nobuyoshi; A Photovoltaic Generation System Acquiring Efficiently the Electrical Energy Generated with Solar Rays,; Graduate School of Tokyo, Metropolitan Institute of Technology; Source: Series on Energy and Power Systems, Proceedings of the Fourth IASTED International Conference on Power and Energy Systems, Jun. 28-30, 2004; p. 97-103. Abstract.
Rajan, Anita; "Maximum Power Point Tracker Optimized for Solar Powered Cars;" Society of Automotive Engineers, Transactions, v 99, n Sect 6, 1990, p. 1408-1420; Abstract.
Mutoh, Nobuyoshi, "A Controlling Method for Charging Photovoltaic Generation Power Obtained by a MPPT Control Method to Series Connected Ultra-electric Double Layer Capacitors;" Intelligent Systems Department, Faculty of Engineering, Graduate School of Tokyo; 39th IAS Annual Meeting (IEEE Industry Applications Society); v 4, 2004, p. 2264-2271. Abstract.
Ho, Billy M.T.; "An Integrated Inverter with Maximum Power Tracking for Grid-Connected PV Systems;" Department of Electronic Engineering, City University of Hong Kong; Conference Proceedings, 19th Annual IEEE Applied Power Electronics Conference and Exposition, Feb. 22-26, 2004; p. 1559-1565.
Esram, T., Chapman, P.L., "Comparison of Photovoltaic Array Maximum Power Point Tracking Techniques," Energy Conversion, IEEE Transactions, Vo. 22, No. 2, pp. 439-449, Jun. 2007.
Nishida, Yasuyuki, "A Novel Type of Utility-interactive Inverter for Photovoltaic System," Conference Proceedings, IPEMC 2004; 4th International Power and Electronics Conference, Aug. 14-16, 2004; Xian Jiaotong University Press, Xian, China; p. 1785-1790. Abstract.

Anon Source; International Symposium on Signals, Circuits and Systems, Jul. 12-13, 2007; Iasi, Romania; Publisher: Institute of Electrical and Electroncis Engineers Computer Society; Abstract.

Case, M.J.; "Minimum Component Photovoltaic Array Maximum Power Point Tracker," Vector (Electrical Engineering), Jun. 1999; p. 4-8; Abstract.

Daher, Sergio; "Analysis, Design and Implementation of a High Efficiency Multilevel Converter for Renewable Energy Systems," Kassel University Press, ISBN: 978-3-89958-236-9, 2006, 147 pages. Abstract.

Xue, John, "PV Module Series String Balancing Converters," Supervised by Geoffrey Walker, Nov. 6, 2002; University of Queensland, School of Information Technology and Electrical Engineering.

Siri, K; "Study of System Instability in Current-mode Converter Power Systems Operating in Solar Array Voltage Regulation Mode," Dept. of Electrical and Electronic Systems, Aerospace Corp., El Segundo, CA; Feb. 6-10, 2000 in New Orleans, LA, 15th Annual IEEE Applied Power Electronics Conference and Exposition, pp. 228-234.

Reimann, T, Szeponik, S; Berger, G; Petzoldt, J; "A Novel Control Principle of Bi-directional DC-DC Power Conversion," 28th Annual IEEE Power Electroncis Specialists Conference, St. Louis, MO Jun. 22-27, 1997; vol. 2 pp. 978-984. Abstract.

Kaiwei, Yao, Mao, Ye; Ming, Xu; Lee, F.C.; "Tapped-inductor Buck Converter for High-step-down DC-DC Conversion," IEEE Transactions on Power Electronics, vol. 20, Issue 4, Jul. 2005; pp. 775-780; Abstract.

Ertl, H; Kolar, J.W.; Zach, F.C.; "A Novel Multicell DC-AC Converter for Applications in Renewable Energy Systems;" IEEE Transactions on Industrial Electronics, Oct. 2002; vol. 49, Issue 5, pp. 1048-1057; Abstract.

Bascope, G.V.T.; Barbi, I; "Generation of a Family of Non-isolated DC-DC PWM Converters Using New Three-state Switching Cells;" 2000 IEEE 31st Annual Power Electronics Specialists Conference in Galway, Ireland; vol. 2, pp. 858-863; Abstract.

Duan, Rouo-Yong; Chang, Chao-Tsung; "A Novel High-efficiency Inverter for Stand-alone and Grid-connected Systems," 2008 3rd IEEE Conference on Industrial Electronics and Applications in Singapore, Jun. 3-5, 2008; Article No. 4582577. Abstract.

Cuadras, A; Ben Amor, N; Kanoun, O; "Smart Interfaces for Low Power Energy Harvesting Systems," 2008 IEEE Instrumentation and Measurement Technology Conference May 12-15, 2008 in Victoria, BC Canada; pp. 78-82 and 12-15. Abstract.

Quan, Li; Wolfs, P; "An Analysis of the ZVS Two-inductor Boost Converter Under Variable Frequency Operation," IEEE Transactions on Power Electronics, Central Queensland University, Rockhamton, Qld, AU; vol. 22, No. 1, Jan. 2007; pp. 120-131. Abstract.

Yuvarajan, S; Dachuan, Yu; Shanguang, Xu; "A Novel Power Converter for Photovoltaic Applications," Journal of Power Sources, Sep. 3, 2004; vol. 135, No. 1-2, pp. 327-331; Abstract.

Power Article, Aerospace Systems Lab, Washington University, St. Louis, MO; estimated at Sep. 2007.

International Application No. PCT/US08/60345, International Search Report dated Aug. 18, 2008.

International Application No. PCT/US08/60345, Written Opinion dated Aug. 18, 2008.

International Application No. PCT/US08/57105, International Search Report dated Jun. 25, 2008.

International Application No. PCT/US08/57105, Written Opinion dated Jun. 25, 2008.

International Application No. PCT/US08/70506, International Search Report dated Sep. 26, 2008.

International Application No. PCT/US08/70506, Written Opinion dated Sep. 26, 2008.

Chen, J., et al. Buck-Boost PWM Converters Having Two Independently Controlled Switches, IEEE Power Electronics Specialists Conference, Jun. 2001, vol. 2, pp. 736-741.

Walker, G. et al. PhotoVoltaic DC-DC Module Integrated Converter for Novel Cascaded and Bypass Grid Connection Topologies—Design and Optimisation, 37th IEEE Power Electronics Specialists Conference / Jun. 18-22, 2006, Jeju, Korea.

Chen, J., et al. A New Low-Stress Buck-Boost Converter for Universal-Input PFC Applications, IEEE Applied Power Electronics Conference, Feb. 2001.

International Application No. PCT/US08/70506 corrected International Preliminary Report on Patentability, mailed Jun. 25, 2010.

Tse, K.K.et al. "A Novel Maximum Power Point Tracking Technique for PV Panels;" Dept. of Electronic Engineering, City Univerisity of Hong Kong; Source: PESC Record—IEEE Annual Power Electronics Specialists Conference, v 4, 2001, p. 1970-1975, Jun. 17-21, 2001; Abstract.

Feuermann, D. et al., Reversible low solar heat gain windows for energy savings. Solar Energy vol. 62, No. 3, pp. 169-175, 1998.

International Patent Application No. PCT/US08/60345. International Prelimianry Report on Patentability dated Aug. 30, 2010.

TwentyNinety.com/en/about-us/, printed Aug. 17, 2010; 3 pages.

National Semiconductor News Release—National semiconductor's SolarMagic Chipset Makes Solar Panels "Smarter" May 2009.

SM3320 Power Optimizer Specifications; SolarMagic Power Optimizer Apr. 2009.

Parallel U.S. Appl. No. 12/738,068; Nonfinal Office Action dated Nov. 24, 2010.

Parallel U.S. Appl. No. 12/682,559; Nonfinal Office Action dated Dec. 10, 2010.

European Patent Application No. 07 873 361.5 Office Communication dated Jul. 12, 2010 and applicant's response dated Nov. 22, 2010.

International Patent Application No. PCT/US2008/079605. International Preliminary Report on Patentability dated Jan. 21, 2011.

Parallel U.S. Appl. No. 12/738,068; Examiner's Interview Summary dated Feb. 3, 2011.

Parallel U.S. Appl. No. 12/682,882; Examiner's Interview Summary dated Feb. 3, 2011.

Parallel U.S. Appl. No. 12/682,559; Examiner's Interview Summary dated Feb. 4, 2011.

International Patent Application No. PCT/US2010/053253. International Search Report and International Written Opinion of the International Searching Authority.

Parallel U.S. Appl. No. 12/682,559; Final Office Action dated Mar. 3, 2011.

Parallel U.S. Appl. No. 12/738,068; Notice of Allowance dated Feb. 24, 2011.

* cited by examiner

HIGHLY EFFICIENT SOLAR POWER SYSTEMS

This application is a continuation of U.S. application Ser. No. 12/682,889, filed Apr. 13, 2010, which is the United States National Stage of International Application No. PCT/US2008/057105, filed Mar. 14, 2008, which claims benefit of and priority to U.S. Provisional Application No. 60/980,157, filed Oct. 15, 2007, U.S. Provisional Application No. 60/982,053, filed Oct. 23, 2007, and U.S. Provisional Application No. 60/986,979, filed Nov. 9, 2007, each said patent application and any priority case hereby incorporated herein by reference.

TECHNICAL FIELD

This invention relates to the technical field of solar power, specifically, methods and apparatus for converting electrical power from some type of solar energy source to make it available for use in a variety of applications. Through perhaps three different aspects, the invention provides techniques and circuitry that can be used to harvest maximum power from a solar cell, a solar panel, or strings of panels so that this power can be provided for DC or AC use, perhaps for transfer to a power grid or the like. These three aspects can exist perhaps independently and relate to: 1) providing electrical power conversion in a multimodal manner, 2) establishing a system that can alternate between differing processes, and 3) systems that can achieve efficiencies in conversion that are extraordinarily high compared to traditional systems.

BACKGROUND

Solar power is one of the more desirable types of renewal energy. For years it has been touted as one of the most promising for our increasingly industrialized society. Even though the amount of solar power theoretically available far exceeds most, if not all, other energy sources (renewable or not), there remain practical challenges to utilizing this energy. In general, solar power remains subject to a number of limitations that have kept it from fulfilling the promise it holds. In one regard, it has been a challenge to implement in a manner that provides adequate electrical output as compared to its cost. The present invention addresses an important aspect of this in a manner that significantly increases the ability to cost-effectively permit solar power to be electrically harnessed so that it may be a cost-effective source of electrical power.

One of the most efficient ways to convert solar power into electrical energy is through the use of solar cells. These devices create a photovoltaic DC current through the photovoltaic effect. Often these solar cells are linked together electrically to make a combination of cells into a solar panel or a PV (photovoltaic) panel. PV panels are often connected in series to provide high voltage at a reasonable current. This may be accomplished to make electrical interconnect losses low. The output of a solar cell or a solar panel, or even combinations thereof, is frequently then converted to make the electrical power most usable since the power converters often employed can use high voltage input more effectively. Conventional power converters sometimes even have their input handled by an MPPT (maximum power point tracking) circuit or part to set voltage, current, and/or power at their input terminals or input connectors to extract the maximum amount of power from one or more or even a string of series connected or interconnected panels or DC power source outputs. One problem that arises with this approach, though, is that often the PV panels act as current sources and when combined in a series string, the lowest power panel can limit the current through every other panel.

Furthermore, solar cells historically have been made from thin film semiconductors such as silicon pn junctions. These junctions or diodes convert sunlight into electrical power. These diodes can have a characteristically low voltage output, often on the order of 0.6 volts. Such cells may behave like current sources in parallel with a forward diode. The output current from such a cell may be a function of many construction factors and, is often directly proportional to the amount of sunlight.

The low voltage of such a solar cell can be difficult to convert to power suitable for supplying power to an electric power grid. Often, many diodes are connected in series on a photovoltaic panel. For example, a possible configuration could have 36 diodes or panels connected in series to make 21.6 volts. With the shunt diode and interconnect losses in practice such panels might only generate 15 volts at their maximum power point (MPP). For some larger systems having many such panels, even 15 volts may be too low to deliver over a wire without substantial losses. In addition, typical systems today may combine many panels in series to provide voltages in the 100's of volts in order to minimize the conduction loss between the PV panels and a power converter.

Electrically, however, there can be challenges to finding the right input impedance for a converter to extract the maximum power from such a string of PV panels. The aspect of extracting power at a maximum power point is often referred to as MPP tracking. Some such systems exist, however, there remain limitations, some of which are discussed here. First, the PV panels may act as current sources. As such, the panel producing the lowest current may limit the current through the whole string. In an undesirable case, if one weak panel is producing moderately less, it might become back biased by the remainder of the panels. Reverse diodes can be placed across each panel to limit the power loss in this case and to protect the panel from reverse breakdown.

In systems, at least the following problems can arise and cause some degree of loss in solar energy harvesting:
  A. Non-uniformity between panels.
  B. Partial shade
  C. Dirt or accumulated matter blocking sunlight
  D. Damage to a panel
  E. Non-uniform degradation of panels over time It may also be troublesome when expensive PV panels are placed in series and the weakest panel limits the power from every other panel. Unfortunately, the series connection may be desired to get high enough voltage to efficiently transmit or supply power through a local distribution to a load, perhaps such as a grid-tied inverter. Further, in many systems, the PV panels may be located on a rooftop, such as for a residential installation. And the inverter is often located at a distance from the rooftop, such as by the power meter or the like. So in embodiments, a way to connect the panels in series but not suffer the losses caused by the lowest power panel, or any series parallel combination, may be needed. There may also be a desire to use unlike types of panels at the same time perhaps without regarding to the connection configuration desired (series or parallel, etc.).

The techniques of photovoltaic power conversion have been recognized as an important limit to solar energy ultimately realizing its potential. Methods of solar power conversion have been proposed that utilize DC/DC converters on each panel along with an MPP circuit as one attempt to enhance the efficiency of energy harvesting when utilizing strings of solar panels. Such attempts, however, have resulted in unacceptably low efficiencies that have made such approaches impractical. These techniques have even been dismissed to some degree by those considering such issues. For example, in the article by G. R. Walker, J. Xue and P. Sernia entitled "PV String Per-Module Maximum Power Point Enabling Converters" those authors may have even suggested that efficiency losses were inevitable but that this module approach held advantages, even though it was attended by poor efficiency. Similarly, two of the same authors, G. R. Walker and P. Sernia in the article entitled "Cascaded DC-DC Converter Connection of Photovoltaic Modules" suggested that the needed technologies are always at an efficiency disadvantage. These references even include an efficiency vs. power graph showing a full power efficiency of approximately 91%. With the high cost of PV panels operation through a low efficiency converter is simply not acceptable in the marketplace.

Another less understood problem with large series strings of PV panels may be with highly varying output voltage, the inverter stage driving the grid my need to operate over a very wide range also lowering its efficiency. It may also be a problem if during periods of time when the inverter section is not powering the grid that the input voltage to this stage may increase above regulatory or safety limits. Or conversely, if the voltage during this time is not over a regulatory limit then the final operational voltage may be much lower than the ideal point of efficiency for the inverter.

In addition, there may be start-up and protection issues which add significant cost to the overall power conversion process. Other less obvious issues affecting Balance of System (BOS) costs for a solar power installation are also involved. Thus, what at least one aspect of electrical solar power needs is an improvement in efficiency in the conversion stage of the electrical system. The present invention provides this needed improvement.

DISCLOSURE OF THE INVENTION

As mentioned with respect to the field of invention, the invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In various embodiments, the present invention discloses achievements, systems, and different initial exemplary architectures through which one may achieve some of the goals of the present invention. Systems provide alternating modes of photovoltaic conversion, high efficiency conversion designs, and even multimodal conversion techniques. Some architectures may combine a PV panel with MPP and even a dual mode power conversion circuit or power conversion portion to make what may be referred to as a Power Conditioners (PC) element. As discussed below, such Power Conditioners may be combined in series or parallel or any combination of series/parallel and can be designed so that the solar panels will largely or even always produce their full output. Even differing types of panels having different output characteristics may be combined to produce maximum power from each panel. In some designs, a series string may be used to get a high voltage useful for power transmission, and each Power Conditioner can be designed to make its maximum power.

In embodiments, this invention may permit each and every panel to individually produce its maximum power thereby harvesting more total energy from the overall system. Systems may be configured with an MPP circuit and a power conversion circuit on each panel. These circuits may be made as simple inexpensive circuitry to perhaps perform several functions. First, this circuit may be designed to extract the maximum power available from each and every panel. Second, it may be configured to transform to an impedance which naturally combines with the other panels in a series string. This circuit may also be configured for parallel connected panels or even for single cells or strings within a panel. Embodiments may be configured so that the output may be a higher voltage output (for example, 400V). Additionally, configurations may allow for an easy to administer overvoltage or other protection, perhaps even with or without feedback or circuit loop elements that control the system and supply of power to avoid an overvoltage or other condition.

The addition of individual MPP circuitry to a panel may even be configured so as to provide an inexpensive addition and, in some embodiments, may replace the need for the same function in the power converter. The circuitry may be added to the PV panels and may not need to be repeated in a grid-tied inverter. This may thus result in the same total circuitry with significant advantage. In embodiments there may actually be several small MPP converters replacing one large one. This may result in even greater energy harvesting.

MODE(S) FOR CARRYING OUT THE INVENTION

As mentioned above, the invention discloses a variety of aspects that may be considered independently or in combination with others. Initial understanding begins with the fact that one embodiment of a power conditioner according to the present invention may combine any of the following concepts and circuits including: an alternative process converter, a dual mode photovoltaic converter, a very high efficiency photovoltaic converter, a multimodal photovoltaic converter, the inclusion of maximum power point tracking (MPP or MPPT) aspects into the foregoing, and even embodiments that include operational boundaries such as for output voltage, output current, and perhaps even, output power. Each of these should be understood from a general sense as well as through embodiments that display initial applications for implementation. Some initial benefits of each of these aspects are discussed individually and in combination in the following discussion as well as how each represents a class of topologies, rather than just those initially disclosed.

Figure 1:
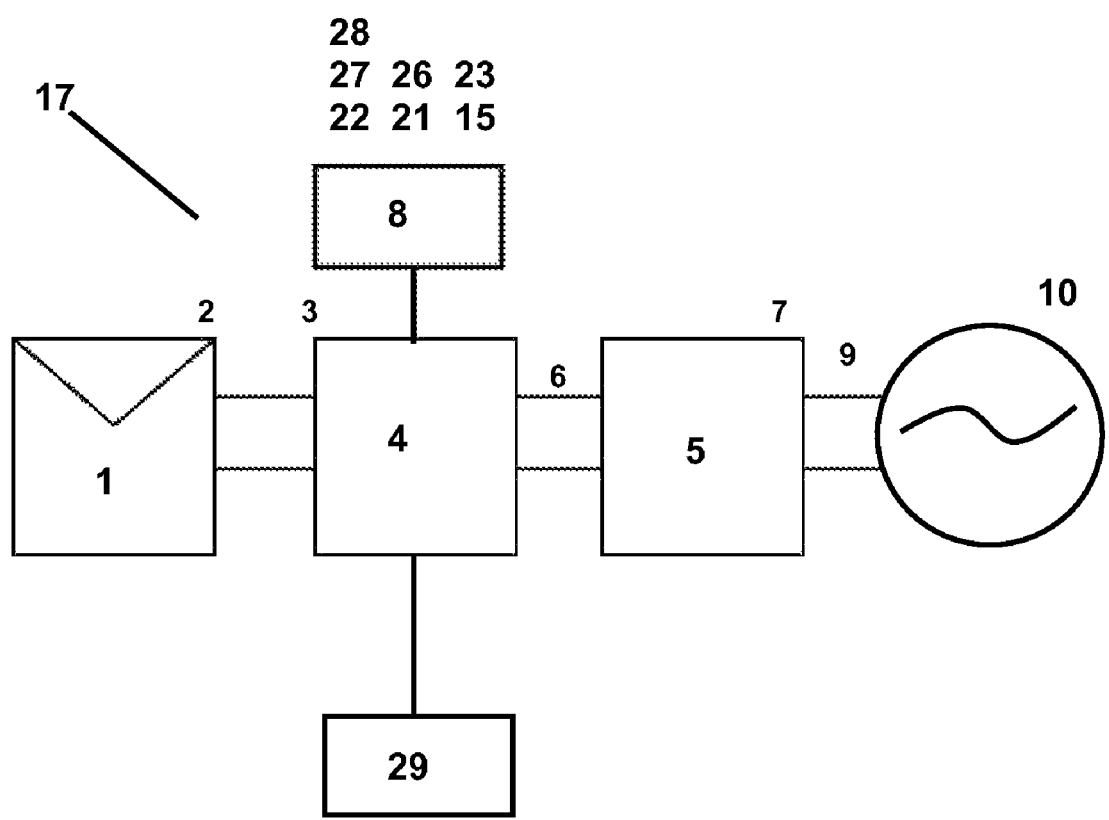
FIG. 1 shows a schematic of a conversion system according to one embodiment of the invention for a single representative solar source.

FIG. 1 shows one embodiment of a solar energy power system illustrating the basic solar conversion principles of the present invention. As shown, it involves a solar energy source (1) feeding into input terminals of a photovoltaic DC-DC power converter (4) providing a converted output through output terminals to a photovoltaic DC-AC inverter (5) that may ultimately interface with a grid (10). As may be appreciated, the solar energy source (1) may be a solar cell, a solar panel, or perhaps even a string of panels. Regardless, the solar energy source (1) is a DC power source that may provide a DC photovoltaic output (2). This DC photovoltaic output (2) may serve as at least part of a DC input (3) to the DC-DC power converter (4).

The DC-DC power converter (4) may have its operation to supply power controlled by a capability or control part generally indicated as converter functionality control circuitry (8). As one of ordinary skill in the art should well appreciate, this converter functionality control circuitry (8) may act as a power supplier and may be embodied as true circuitry hardware or it may be firmware or even software to accomplish the desired control and would still fall within the meaning of a converter functionality control circuitry (8). Similarly, the DC-DC power converter (4) may act as a power supplier and may be considered to represent photovoltaic DC-DC power conversion circuitry. In this regard it is likely that hardware circuitry is necessary, however combinations of hardware, firmware, and software should still be understood as encompassed by the circuitry term.

As illustrated in FIG. 1, the various elements may be connected to each other. Direct connection is but one manner in which the various elements may be responsive to each other, that is, some effect in one may directly or indirectly cause an effect or change in another. The DC-DC power converter (4) may act to convert its input and thus provide a converted DC photovoltaic output (6) which may serve as an input to the DC-AC inverter (5) which may also act as a power supplier and may be of a variety of designs. This DC-AC inverter (5) may or may not be included in embodiments of the solar energy power system. If included, it may serve to accomplish the step of inverting the DC power into an inverted AC (7) such as a photovoltaic AC power output (7) that can be used by, for example, a power grid (10) through some connection termed an AC power grid interface (9). In this manner the system may create a DC photovoltaic output (6) which may be established as an input to some type of DC-AC inverter (5). This step of inverting an input should be understood as encompassing and creation of any substantially alternating signal from any substantially unidirectional current flow signal even if that signal is not itself perfectly, or even substantially, steady.

Figure 2:
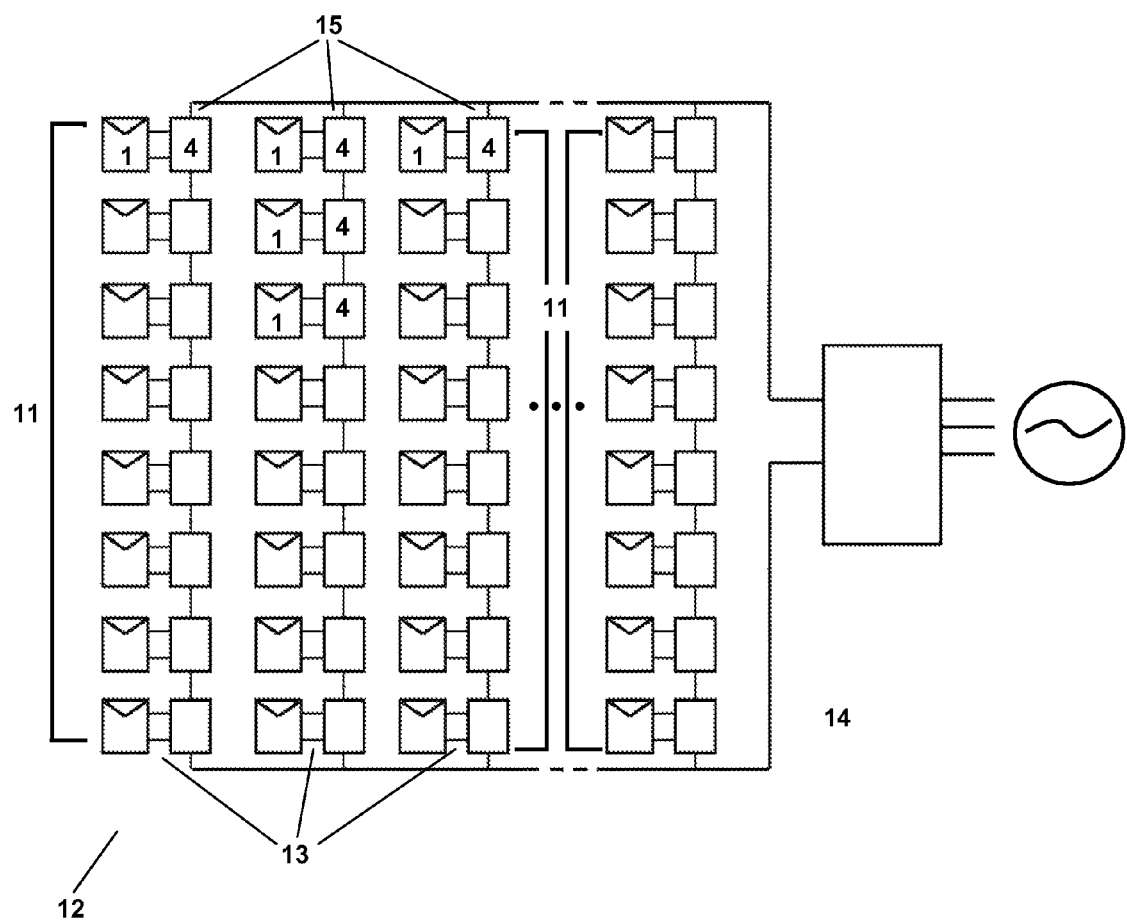
FIG. 2 shows a schematic of a sea of interconnected strings of panels according to one embodiment of the invention.
Figure 6:
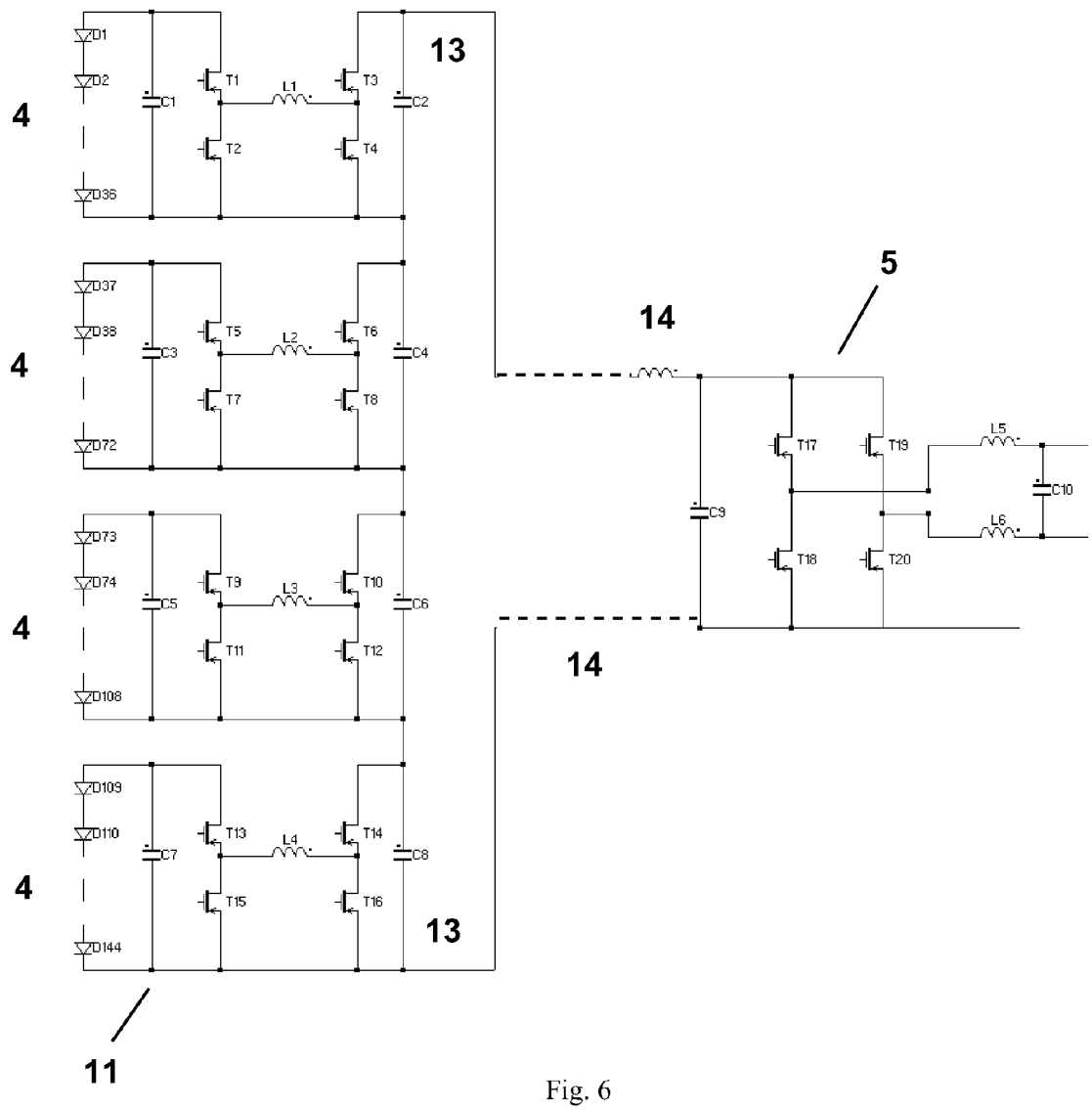
FIG. 6 shows an embodiment of the invention with series connected panels and a single grid-tied inverter configuration.

As show in FIGS. 2 and 6, individual solar energy sources (1)—whether at a cell, panel, or module level—may be combined to create a series of electrically connected sources. Such combinations may be responsive through either series or parallel connections. As shown in FIGS. 2 and 6, the connected plurality may form a string of electrically connected or interconnected items. Perhaps such as a string of electrically connected or interconnected solar panels (11). As shown in FIG. 2, each of these strings may each themselves be a component to a much larger combination perhaps forming a photovoltaic array (12) or even a sea of combined solar energy sources. By either physical or electrical layout, certain of these cells, panels, or strings may be adjacent in that they may be exposed to somewhat similar electrical, mechanical, environmental, solar exposure or illumination (or insolative) conditions. In situations where large arrays are provided, it may be desirable to include a high voltage DC-AC solar power inverter perhaps with a three phase high voltage inverted AC photovoltaic output as schematically illustrated in FIG. 2.

As illustrated for an electrically serial combination, output may be combined so that their voltages may add whereas their currents may be identical. Conversely, electrically parallel combinations may exist. FIGS. 2 and 6 illustrate embodiments that are connected to accomplish serially combining or serially connecting items such as the converted DC photovoltaic outputs (6) of each to create a string of solar panels as well as a converted DC photovoltaic input to an DC-AC inverter (5). As shown, these serial connections may be of the converted DC photovoltaic outputs (6) which may then create a converted DC photovoltaic output (13) which may serve as at least part of a converted DC photovoltaic input (14) to some type of photovoltaic DC-AC inverter (5) or other load. Again, each solar power source (1) may be at the cell, panel, string, or even array level. As would be well understood, parallel connections and the step of parallel connecting converters or their outputs could be accomplished as well.

As mentioned above, circuitry and systems can be configured to extract as much power as possible from the solar power sources (1). Electrically, this is accomplished by achieving operation to operate at one or more solar cell, panel, or string's maximum power point (MPP) by MPP circuitry or maximum power point tracking (MPPT). Thus, in embodiments, a solar power system according to the invention may include: an MPPT control circuit with a power conversion circuit. It may even include range limiting circuitry as discussed later.

Figure 3:
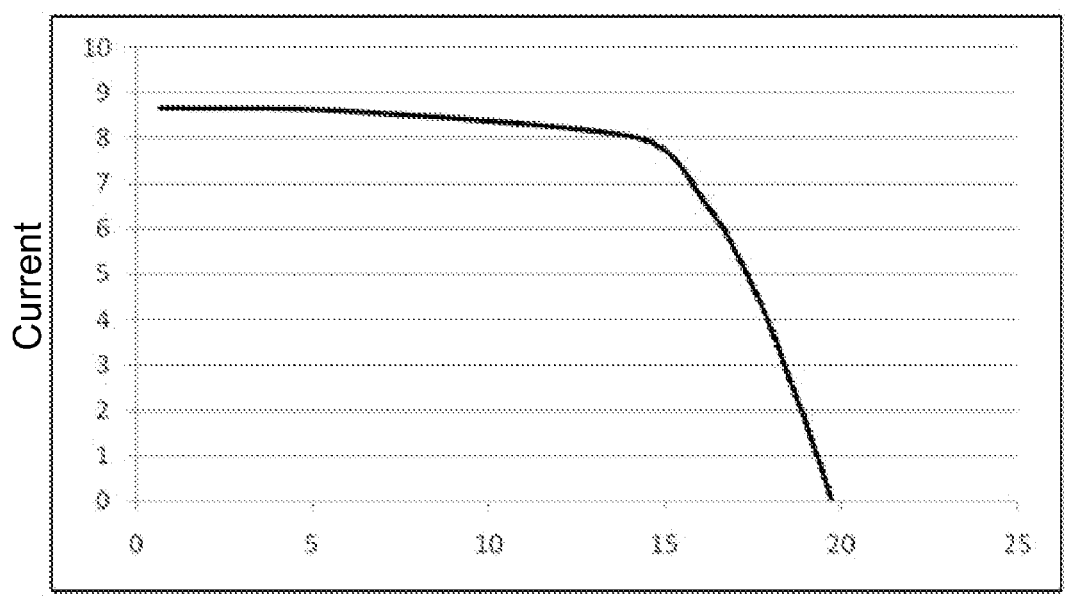
FIG. 3 shows a plot of a current and voltage relationship for a representative solar panel.
Figure 4:
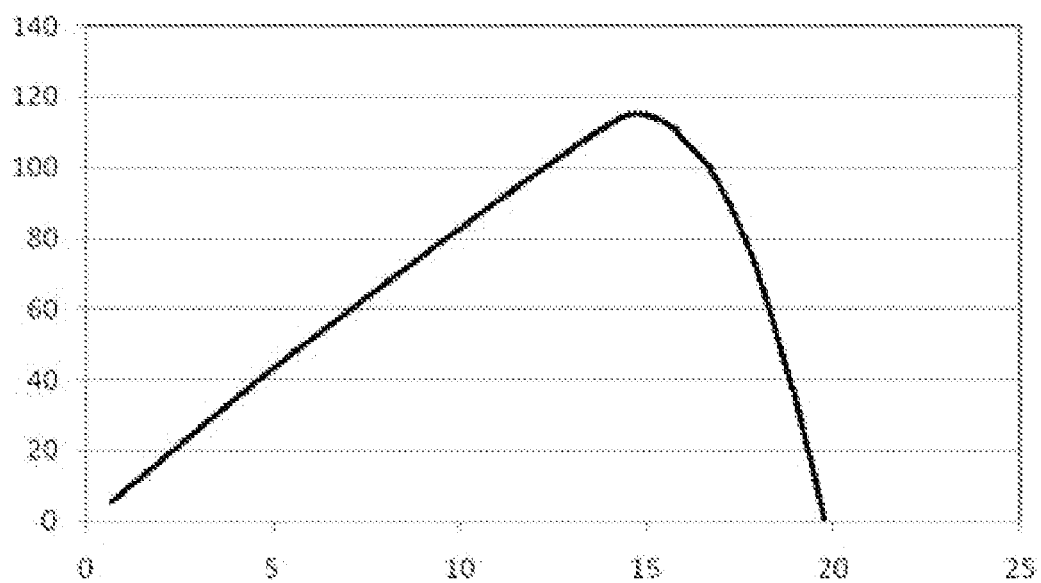
FIG. 4 shows a plot of a power and voltage relationship for a similar panel.

The aspect of maximum power point is illustrated by reference to FIGS. 3 and 4 and the Maximum Power Point Tracking (MPPT) circuit may be configured to find the optimum point for extracting power from a given panel or other solar energy source (1). As background, it should be understood that a panel such as may be measured in a laboratory may exhibit the voltage and current relationships indicated in FIG. 3. Current in Amps is on the vertical axis. Voltage in volts is on the horizontal axis. If one multiplies the voltage times the current to derive power this is shown in FIG. 4. Power is now on the vertical axis. The goal of an embodiment of an MPPT circuit as used here may be to apply an appropriate load resistance or more precisely impedance to a panel such that the panel may operate to provide its peak power. One can see graphically that the maximum power point on this panel under the measurement conditions occurs when the panel produces approximately 15 volts and 8 amperes. This may be determined by a maximum photovoltaic power point converter functionality control circuitry (15) which may even be part or all of the modality of operation of the converter functionality control circuitry (8). In this fashion, the converter or the step of converting may provide a maximum photovoltaic power point modality of photovoltaic DC-DC power conversion or the step of maximum photovoltaic power point converting. As mentioned below, this may be accomplished by switching and perhaps also by duty cycle switching and as such the system may accomplish maximum photovoltaic power point duty cycle switching or the step of maximum photovoltaic voltage determinatively duty cycle switching.

As one skilled in the art would appreciate, there are numerous circuit configurations that may be employed to derive MPP information. Some may be based on observing short circuit current or open circuit voltage. Another class of solutions may be referred to as a Perturb and Observe (P&O) circuit. The P&O methods may be used in conjunction with a technique referred to as a "hill climb" to derive the MPP. As explained below, this MPP can be determined individually meaning for each source, for adjacent sources, or for entire strings to achieve best operation. Thus a combined system embodiment may utilize individually or multiple or panel (understood to include any source level) dedicated maximum photovoltaic power point converter functionality control circuitries (16).

Regardless of whether individually configured or not, in one P&O method, an analog circuit could be configured to take advantage of existing ripple voltage on the panel. Using simple analog circuitry it may be possible to derive panel voltage and its first derivative (V'), as well as panel power and its first derivative (P'). Using the two derivatives and simple logic it may be possible to adjust the load on the panel as follows:

TABLE 1

| V' Positive | P' Positive | Raise MPP |
| V' Positive | P' Negative | Lower MPP |
| V' Negative | P' Positive | Lower MPP |
| V' Negative | P' Negative | Raise MPP |

There may be numerous other circuit configurations for finding derivatives and logic for the output, of course. In general, a power conditioner (17) may include power calculation circuitry (firmware, or software) (21) which may even be photovoltaic multiplicative resultant circuitry (22). These circuitries may act to effect a result or respond to an item which is analogous to (even if not the precise mathematical resultant of a V*I multiplication function) a power indication. This may of course be a V*I type of calculation of some power parameters and the system may react to either raise or lower itself in some way to ultimately move closer to and eventually achieve operation at an MPP level. By provided a capability and achieving the step of calculating a photovoltaic multiplicative power parameter, the system can respond to that parameter for the desired result.

In embodiments where there is a series string of power conditioners (17) or the like, the current through each PC output may be the same but the output voltage of each PC may be proportional to the amount of power its panel makes. Consider the following examples to further disclose the functioning of such embodiments. Examine the circuit of FIG. 6 and compare it to panels simply connected in series (keep in mind that the simple series connection may have a reverse diode across it). First, assume there are four panels in series each producing 100 volts and 1 amp feeding an inverter with its input set to 400 volts. This gives 400 watts output using either approach. Now consider the result of one panel making 100 volts and 0.8 amps (simulating partial shading—less light simply means less current). For the series connection the 0.8 amps flows through each panel making the total power 400× 0.8=320 watts. Now consider the circuit of FIG. 6. First, the total power would be 380 watts as each panel is making its own MPP. And of course the current from each Power Conditioner must be the same as they are after all still connected in series. But with known power from each PC the voltage may be calculated as:

$$3V+0.8V=400 \text{ volts, where V is the voltage on each full power panel.}$$

Thus, it can be seen that in this embodiment, three of the panels may have 105.3 volts and one may have 84.2 volts.

Further, in FIG. 6 it can be understood that in some embodiments, an additional benefit may be derived from the inclusion of individual power control. In such embodiments, a power block or interconnected DC power source may supply power sourced from more than one cell or panel and may be considered as a group of PV panels with internal connection, power conversion and MPP per panel configurations. As shown in FIGS. 2 and 6, this power block could have four or eight panels, or any number as mentioned. As such they may adapt their output as needed to always maintain maximum power from each and every power block. If adapted to be used with such a string of power blocks, the system may even operate with a varying voltage on its output.

The advantage of this type of a configuration is illustrated from a second example of MPP operation. This example is one to illustrate where one panel is shaded such that it can now only produce 0.5 amps. For the series connected string, the three panels producing 1 amp may completely reverse bias the panel making 0.5 amps causing the reverse diode to conduct. There may even be only power coming from three of the panels and this may total 300 watts. Again for an embodiment circuit of invention, each PC may be producing MPP totaling 350 watts. The voltage calculation would this time be:

$$3V+0.5V=400 \text{ volts}$$

This, in this instance, the three panels may have a voltage of 114.2 volts and the remaining one may have half as much, or 57.1 volts. Output voltage can be seen as proportional to PV panel output power thus yielding a better result.

These are basic examples to illustrate some advantages. In an actual PV string today there may be many PV panels in series. And usually none of them make exactly the same power. Thus, many panels may become back biased and most may even produce less than their individual MPP. This can be overcome by embodiments of the present invention. In FIG. 6 there is shown a power converter for taking power from this internally connected panel string and powering the grid. As discussed below, such configuration may need voltage limits and/or protection or safety module protection perhaps by setting operational boundaries.

A power conditioner (17) may be configured to always extract the maximum power from a PV panel. According to embodiments of the invention, this may be accomplished by an impedance transformation capability provided through the power conditioner (17), the photovoltaic DC-DC power converter (4), or the converter functionality control circuitry (8). Such may act to transform the impedance of the individual or group power delivery as needed to maintain the MPP or other predetermined value or threshold. The system may thus cause a variation in the voltage of each panel as it achieves maximum output for each. Based on topology of the system, this may be accomplished perhaps with a maintained, constant or common current so the series string is at maximum power. In embodiments, the invention may be configured to increase or decrease the load impedance for one panel and may even provide a fixed voltage if desired.

Figure 5A:
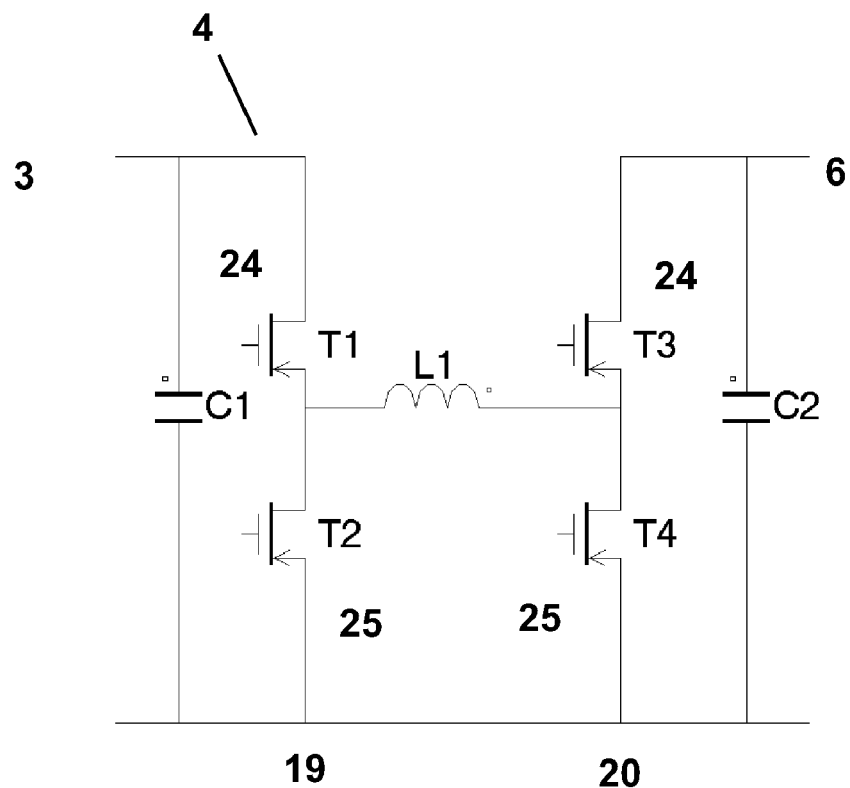
FIGS. 5A and 5B show two types of dual mode power conversion circuits such as might be used in embodiments of the invention.
Figure 5B:
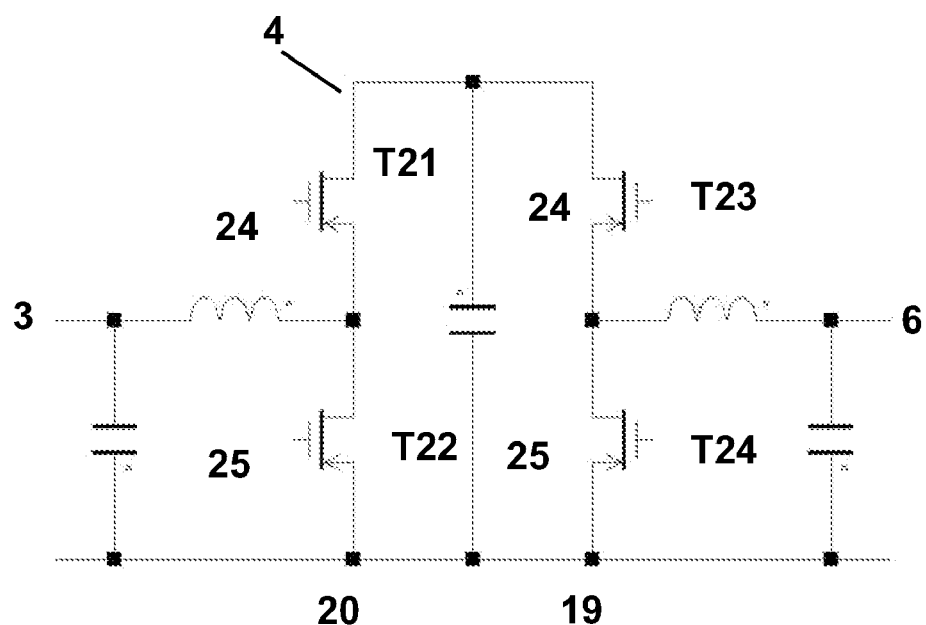

As suggested above, a photovoltaic impedance transformation modality of photovoltaic DC-DC power conversion can be accomplished by photovoltaic impedance transformation power conversion control circuitry. Two embodiments of switching or switchmode photovoltaic impedance transformation photovoltaic DC-DC power converters are shown in FIGS. 5A and 5B. As may be appreciated from the internal connections shown, the switches included may be controlled by converter functionality control circuitry (8) or portion for duty cycle switching or pulse width modulation, that is switching at periodic (even if not constant or if having varying periods) times to accomplish a variety of goals.

This switching can occur in a variety of ways. There may also be variations in the method for switching from one mode to another. For example, if a minimum pulse width is set, it may be possible to further reduce the energy or alter the impedance by going to a burst mode as discussed below. If a minimum duty cycle is set to 2%, it is possible to get 0.2% energy transfer by using occasional bursts of the 2% duty cycle with a burst duty cycle of say 10%. Much of this may be achieved by frequency altered switching or other control of differing switches. Thus embodiment may provide switch frequency alteration switching photovoltaic power conversion control circuitry. This can give the possibility of a smooth transformation from one mode to another while providing high efficiency during the transformation.

Goal in switching may include the maximum power point operation discussed above as well as a number of modalities as discussed below. Some of these modalities may even be slaved such that one takes precedence of one or another at some point in time, in some power regime, or perhaps based on some power parameter to achieve a variety of modalities of operation. Again some of these modalities are discussed later. In the context of impedance transformation, however, there may be photovoltaic impedance transformation duty cycle switching, and such may be controlled by photovoltaic impedance transformation duty cycle switch control circuitry (again understood as encompassing hardware, firmware, software, and even combinations of each.

With reference to the particular embodiments illustrated as but two examples in FIGS. 5A and 5B, it may be understood that the photovoltaic DC-DC power converter (4) may be operated to cause the photovoltaic impedance to increase or decrease. These two alternative modes of operation may even be exclusive in that either one or the other may exist at any point in time, even if such operations change over time. As such, embodiment may include photovoltaic impedance increase photovoltaic DC-DC power conversion circuitry (19) or buck converter part, and perhaps photovoltaic impedance decrease photovoltaic DC-DC power conversion circuitry (20) or boost converter part. Examples of these two are illustrated in FIGS. 5A and 5B where it can be considered that a first part of the photovoltaic DC-DC power converter (4) acts in one way (up in FIG. 5A and down in FIG. 5B) and a second part of the photovoltaic DC-DC power converter (4) acts in the other way (down in FIG. 5A and up in FIG. 5B). Thus it can be seen that modes of operation in the photovoltaic DC-DC power converter (4) may be opposing in that one accomplishes an effect and the other accomplishes a contrary effect. Embodiments of the system may provide at least one photovoltaic impedance increase modality of photovoltaic DC-DC power conversion and at least one photovoltaic impedance decrease modality of photovoltaic DC-DC power conversion. As shown for the two embodiments in FIGS. 5A and 5B, both of these modalities may be provided in one photovoltaic DC-DC power converter (4) so that the photovoltaic DC-DC power converter (4) may achieve the steps of photovoltaic load impedance increasing and photovoltaic load impedance decreasing. Such elements may also be disjunctive so that in alternative operation one operates when the other does not and visa versa. Such may also be substantially disjunctive so that for only power conversion insignificant periods where they both actually or appear to operate in similar timeframes. Thus the system may include substantially disjunctive impedance transformation photovoltaic power conversion control circuitry. Through the power conditioner (17) configuration and design the system may provide switching or other capability and, if applicable, control circuitry that may provide the desired effect.

Referring again to the embodiments shown in FIGS. 5A and 5B, it can be seen that some embodiments may utilize one or more switches that may be controlled by photovoltaic switch control circuitry (23) and thus the power conditioner (17) may be of a switchmode character. In the embodiments shown, these switches are designated T1-T4 and T21-T24. In some embodiments, these switches may be semiconductor switches and this may facilitate lower losses and higher efficiency. Furthermore, the switches and connections may be configured to provide one or more photovoltaic power series switch elements (24) and one or more photovoltaic power shunt switch elements (25). As may be appreciated the photovoltaic power series switch elements (24) may provide one or more locations at which the transmission of photovoltaic power may be interrupted (the act of interrupting) and the photovoltaic power shunt switch elements (25) may provide one or more locations at which the transmission of photovoltaic power may be shunted (the act of shunting) to ground, another power path, or the like.

As the illustrations in FIGS. 5A and 5B also illustrate, embodiments may include not just one switch, not just one series and shunt switch, but even pairs of series pathed and shunt pathed semiconductor (or other) switches. Thus, the interrupting and the shunting can occur at least two separate semiconductor switch locations. Obviously, these examples are configured to more simply illustrate each of the switching, interrupting, shunting, and pairing concepts, however, it should be understood that more complex configurations are possible. As with many circuitry aspects, some designs may even be arranged to elusively achieve the same effect; these would still fall within the scope of the present invention, of course.

As may be appreciated from just the initially discussed modes of operation, namely, the modes of increasing and, perhaps alternatively, decreasing photovoltaic load impedance, systems according to embodiments of the present invention may provide a photovoltaic DC-DC power converter (4) that serves as a multimodal photovoltaic DC-DC power converter perhaps controlled by multimodal converter functionality control circuitry (26) in that it has more than one mode of operation. These modes may include, but should be understood as not limited to, photovoltaic impedance increasing and photovoltaic impedance decreasing; several other modes are discussed below. In general, the aspect of multimodal activity encompasses at least processes where only one mode of conversion occurs at any one time. Impedance, or any other factor, is not increased and then decreased in the same process regardless of the desired outcome. Only a single method of conversion is used, perhaps with a singular integration.

Thus, a power conditioner (17) may provide at least first modality and second modality photovoltaic DC-DC power conversion circuitry, DC-DC power converter, or DC-DC power conversion. Further, as can be understood in an MPP context of increasing or decreasing photovoltaic load impedance, the multimodal photovoltaic DC-DC power converter or perhaps multimodal converter functionality control circuitry (26) may respond to one or more photovoltaic power condition, perhaps such as the V*I multiplicative factor, a voltage level, a current level, or some other perhaps signal indicated or calculated set point or predetermined value. In so offering the capability of more than one mode of conversion operation (even though not necessarily utilized at the same time), or in offering the capability of changing modes of operation, the system may accomplish the step of multimodally converting a DC photovoltaic input into a converted photovoltaic DC output. Similarly, by offering the capability of controlling to effect more than one mode of conversion operation (again, even though not necessarily utilized at the same time), or in controlling to change modes of operation, the system may accomplish the step of multimodally controlling operation of a photovoltaic DC-DC power converter (4).

Embodiments may include even two or more modes of operation and thus may be considered a dual mode power conversion circuit or dual mode converter. The dual mode nature of this circuit may embody a significant benefit and another distinction may be that most DC/DC converters are often intended to take an unregulated source and produce a regulated output. In this invention, the input to the DC/DC converter is regulated to be at the PV panel MPP. The power taken from the PV panel may be transformed to whatever impedance is needed in the output connection or output connector to be able to satisfy the input MPP requirement even without regarding to output.

In the case of the impedance being changed such that the output voltage is lower than the input voltage (buck), T3 can be forced to be in a continuous conduction state and T4 in a non-conducting state with T1 and T2 operated in a switchmode duty cycle state. This duty cycle of operation can be synchronous in that the transistor T2 may be switched synchronously with T1 (with inverted duty cycle). T2 may be a low $R_{DS(ON)}$ FET having much lower losses than a diode in this location. By such synchronous operation this circuit can have extremely high efficiency as mentioned more generally below. A concern can exist for this circuit in that current passes through an additional transistor, T3. But this transistor can have low loss as it is not switching. Similar operation can be achieved for the embodiment shown in FIG. 5B, of course.

A second mode for the circuit shown in FIG. 5A can involve the case where the impedance needs to be altered such that the output voltage is higher than the input voltage (boost). Now, T1 may be switched to a continuous conduction state. T2 may be non-conducting. Now transistors T3 and T4 are controlled in a switchmode manner. One may see the same ideas apply. First, all switches are transistors having low on-state loss. Secondly the boost section or boost converter may operated with high efficiency with the only additional loss due to the dual mode capability in the on-state loss of transistor T1. This circuit can also make use of a common inductor L1 shared by the two converter sections saving size, space and cost. Again, as a person of ordinary skill in the art would understand, similar operation can be achieved for the embodiment shown in FIG. 5B.

Interesting, and as discussed in more detail below, while in prior art efficiency was sometimes shown to be less than 91%, this circuit accomplishes the needed function while operating even above 98% and at levels as high as 99.2% efficiency. When connected to a solar panel or an array of solar panels this efficiency difference can be of paramount importance. Of course, isolated and non isolated impedance transformations by analogy to DC/DC converters of many sorts may be used with other disclosed aspects of this invention, and almost any DC/DC converter topology may be used for this function and is hereby included in this invention As mentioned briefly above, there may be alternating modes of operation and the system may be selectively activated or may vacillate (and achieve vacillatory conversion modes) between differing modes based upon a parameter or other indication or calculation. In embodiments where one mode or another is substantially exclusively activated, a power conditioner (17) or other system element may provide an alternative mode photovoltaic power converter functionality control (27). It may exclusively switch between modes at least some times. These modes may be modes of conversion and so the system may provide a vacillatory method of creating solar power. As indicated above, these modes may be opposing or opposing modalities, substantially disjunctive, or otherwise.

In exclusively controlling a particular operational mode, systems may disable an unused mode. This can be important, for example, to achieve the higher levels of efficiency mentioned below or the like. Referring to the examples illustrated in the context of photovoltaic impedance transformation in FIGS. 5A and 5B, it can be understood how embodiments of the invention can act to disable a mode of photovoltaic DC-DC power conversion or operation at least some times and thus the system can provide disable alternative mode photovoltaic power conversion control circuitry (28). As discussed with respect to switch operation in the context of MPP, above, one or more switch(es), perhaps such as the photovoltaic power shunt switch element (25), one of the photovoltaic power series switch elements (24), or otherwise may be disabled during an operation. This may provide a capability to compare modes of operation or, perhaps most importantly, may permit highly efficient operation previously not believed achievable. Thus embodiments may provide photovoltaic disable mode converter functionality control circuitry.

Figure 7A:
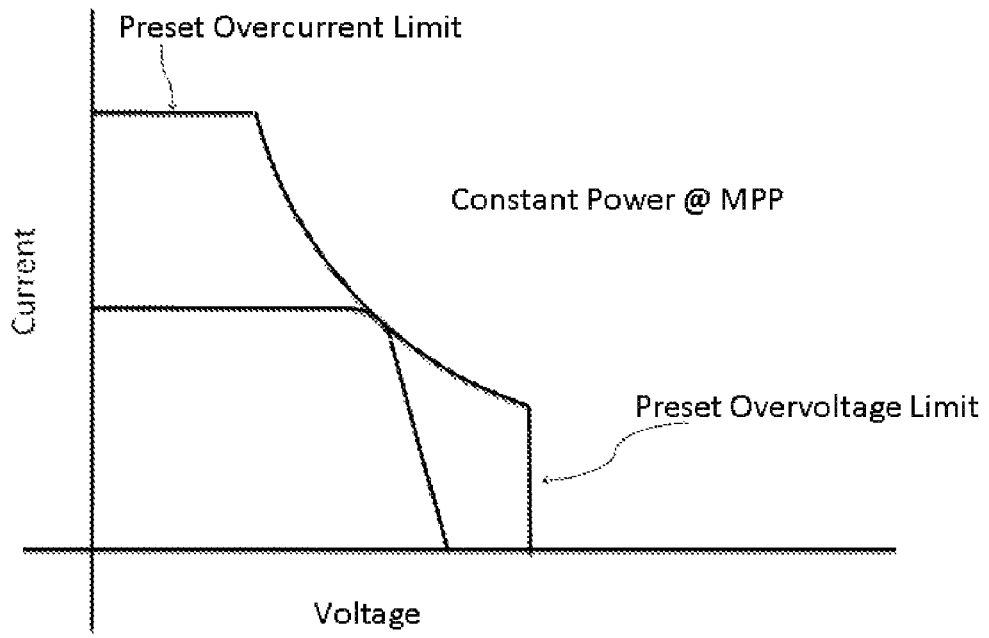
FIGS. 7A and 7B show plots of solar panel output operational conditions for differing temperatures and output paradigms.
Figure 7B:
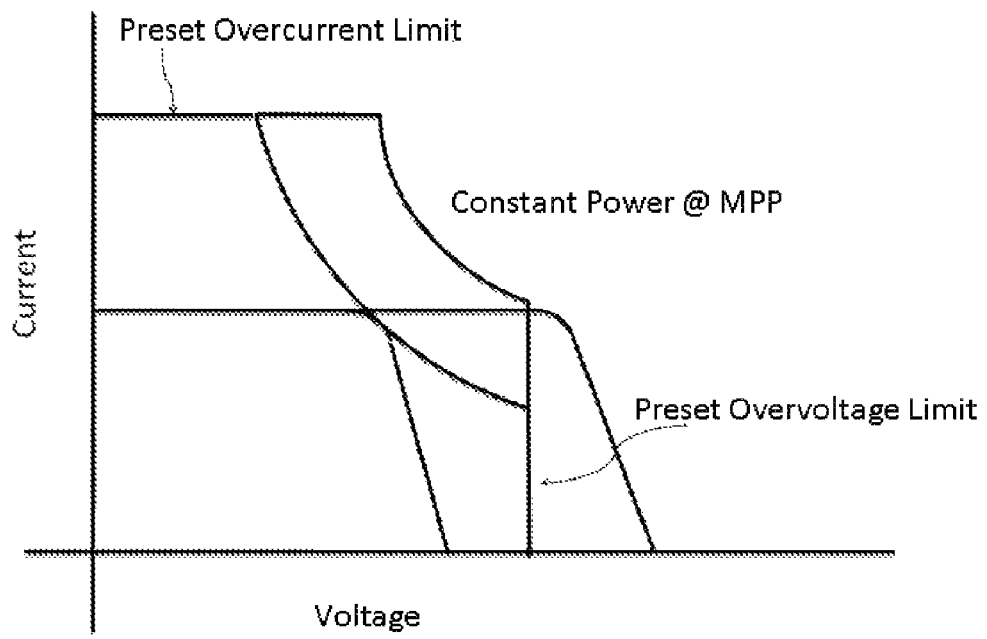
Figure 8:
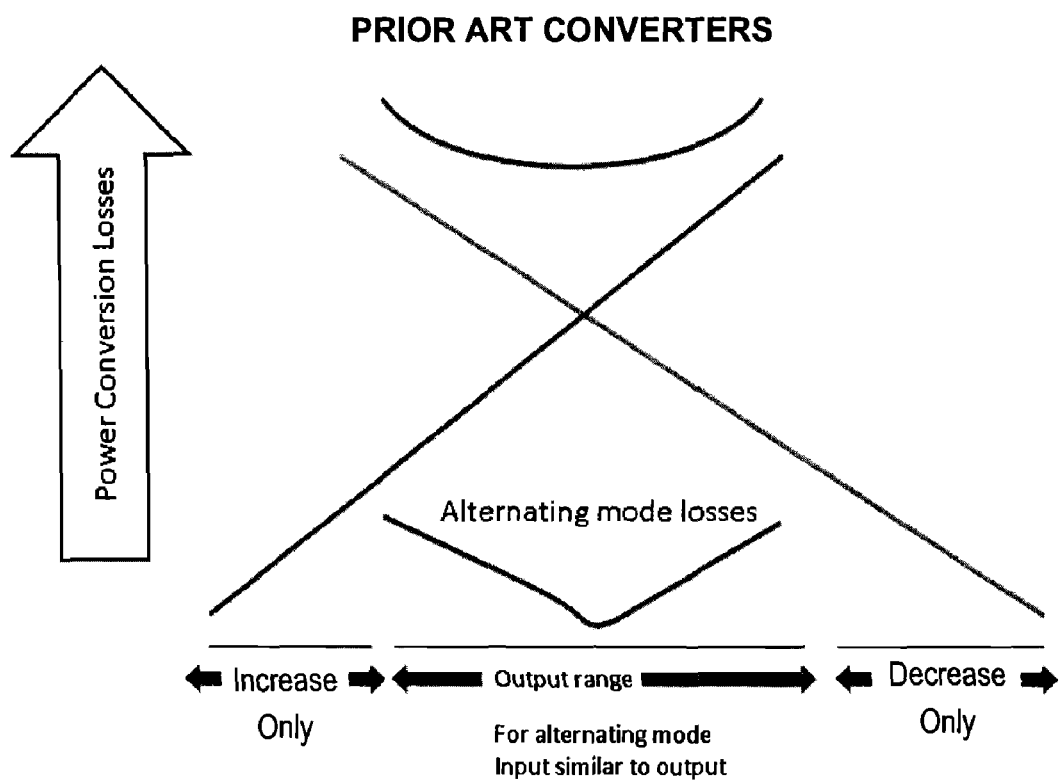
FIG. 8 shows a plot of losses by topology and range for traditional approach as compared to the present invention.

An aspect of operational capability that afford advantage is the capability of embodiments of the invention to accommodate differing operating conditions for various solar sources or panels. As shown in FIGS. 7A and 7B, voltages of operation for maximum power point can vary based upon whether the solar source is experiencing hot or cold temperature conditions. By permitting MPP to be accommodated through impedance transformation apart from any voltage constraint, embodiments according to the invention may provide expansive panel capability. This may even be such that the converter is effectively a full photovoltaic temperature voltage operating range photovoltaic DC-DC power converter whereby it can operate at MPP voltages as high as that for the MPP in a cold temperature of operation as well as the MPP voltages as low as that for the MPP in a hot temperature of operation. Thus, as can be understood from FIGS. 7A and 7B, systems can provide solar energy source open circuit cold voltage determinative switching photovoltaic power conversion control circuitry and solar energy source maximum power point hot voltage determinative switching photovoltaic power conversion control circuitry. It can even achieve full photovoltaic temperature voltage operating range converting. This may be accomplished through proper operation of the switch duty cycles and systems may thus provide solar energy source open circuit cold voltage determinatively duty cycle switching and solar energy source maximum power point hot voltage determinatively duty cycle switching.

Further, viewing hot and cold voltages as perhaps the extreme conditions, similarly it can be understood how the system may accommodate varying amount of insolation and thus there may be provided insolation variable adaptive photovoltaic converter control circuitry that can extract MPP whether a panel is partially shaded, even if relative to an adjacent panel. Systems and their duty cycle switching may be adaptable to the amount of insolation monitored and so the step of converting may be accomplished as insolation variably adaptively converting. This can be significant in newer technology panels such as cadmium-telluride solar panels and especially when combining outputs from a string of cadmium-telluride solar panels which can have broader operating voltages.

As mentioned earlier, an aspect of significant important is the level of efficiency with which the converter operates. This is defined as the power going out after conversion over the power coming in before conversion. A portion of the efficiency gain is achieved by using switchmode operation of transistor switches, however, the topology is far more significant in this regard. Specifically, by the operation of switches and the like as discussed above, the system can go far beyond the levels of efficiency previously thought possible. It can even provide a substantially power isomorphic photovoltaic DC-DC power conversion that does not substantially change the form of power into heat rather than electrical energy by providing as high as about 99.2% efficiency. This can be provided by utilizing substantially power isomorphic photovoltaic converter functionality and a substantially power isomorphic photovoltaic impedance converter and by controlling operation of the switches so that there is limited loss as discussed above. Such operation can be at levels of from 97, 97.5, 98, 98.5 up to either 99.2 or essentially the wire transmission loss efficiency (which can be considered the highest possible).

One aspect that contributes to such efficiency is the fact that minimal amounts of energy are stored during the conversion process. As shown in FIGS. 5A and 5B, such embodiments may include a parallel capacitance and a series inductance. These may be used to store energy at least some times in the operation of converting. It may even be considered that full energy conversion is not accomplished, only the amount of conversion necessary to achieve the desired result. Thus embodiments may serve as a low energy storage photovoltaic DC-DC power converter and even a partial energy storage photovoltaic DC-DC power converter. In situations where the voltage in and the voltage out are nearly identical and thus the converter achieves unity conversion, there is even substantially no change in energy storage and so the system may have embodiments that are considered a substantially constant energy storage photovoltaic DC-DC power converter. Cycle-by-cycle energy storage may also be proportional (whether linearly, continuously, or not) to a voltage difference in conversion. Energy stored, perhaps in the inductor may also be proportional to a duty cycle for one or more switches. Part of the efficiency can also be considered as existing as a result of the fact that during operation some switches may remain static and either open or closed. Thus embodiment may provide static switch alternative mode photovoltaic power conversion control circuitry and similarly, static switch converting. It may also provide fractional switch element control circuitry.

Switches can be controlled in a variable duty cycle mode of operation such that frequency of switching alters to achieve the desired facet. The converter functionality control circuitry (8) may thus serve as photovoltaic duty cycle switch control circuitry. The duty cycle operations and switching can achieve a variety of results, from serving as photovoltaic impedance transformation duty cycle switching, to other operations. Some of these may even be due to considerations apart from the conversion aspect that is the primary purpose of the photovoltaic DC-DC power converter (4).

While in theory or in normal operation the described circuits work fine, there can be additional requirements for a system to have practical function. For example the dual mode circuit as described could go to infinite output voltage if there were no load present. This situation can actually occur frequently. Consider the situation in the morning when the sun first strikes a PV panel string with power conditioners (17). There may be no grid connection at this point and the inverter section may not draw any power. In this case the power conditioner (17) might in practical terms increase its output voltage until the inverter would break. The inverter could have overvoltage protection on its input adding additional power conversion components or, the power conditioner may simply have its own internal output voltage limit. For example if each power conditioner (17) could only produce 100 volts maximum and there was a string of ten PCs in series the maximum output voltage would be 1000 volts. This output voltage limit could make the grid-tied inverter less complex or costly and is illustrated in FIG. 7A as a preset or predetermined overvoltage limit or value or criteria. Thus embodiments can present maximum voltage determinative switching photovoltaic power conversion control circuitry and maximum photovoltaic voltage determinative duty cycle switching (as shown in FIG. 7A as the preset overvoltage limit). This can be inverter specific.

A maximum output current limit may also be useful and is illustrated in FIG. 7A as the preset or predetermined overcurrent limit or value. This is less straightforward and is related to the nature of a PV panel. If a PV panel is subjected to insufficient light its output voltage may drop but its output current may not be capable of increasing. There can be an advantage to only allowing a small margin of additional current. For example, this same 100 watt panel which has a 100 volt maximum voltage limit could also have a 2 amp current limit without limiting its intended use. This may also greatly simplify the following grid tied inverter stage. Consider an inverter in a large installation which may need a crowbar shunt front end or parallel shunt regulator for protection. If the output of a PC could go to 100 amps the crowbar would have to handle impractical currents. This situation would not exist in a non PC environment as a simple PV panel string could be easily collapsed with a crowbar circuit. This current limit circuit may only be needed with a PC and it may be easily achieved by duty cycle or more precisely switch operation control. Once a current limit is included another BOS savings may be realized. Now the wire size for interconnect of the series string of PCs may be limited to only carry that maximum current limit. Here embodiments can present maximum photovoltaic inverter current converter functionality control circuitry, inverter maximum current determinative switching, photovoltaic inverter maximum current determinative duty cycle switch control circuitry, and photovoltaic inverter maximum current determinatively duty cycle switching or the like.

One more system problem may also be addressed. In solar installations it may occur on rare conditions that a panel or field of panels may be subjected to more than full sun. This may happen when a refractory situation exists with clouds or other reflective surfaces. It may be that a PV source may generate as much as 1.5 times the rated power for a few minutes. The grid tied inverter section must either be able to operate at this higher power (adding cost) or must somehow avoid this power. A power limit in the PC may be the most effective way to solve this problem. In general, protection of some other element can be achieved by the converter. This may even be a posterior or downstream element such as the inverter and so the converter functionality control circuitry (8) may serve to achieve photovoltaic inverter protection modality of photovoltaic DC-DC power conversion and may be considered as photovoltaic inverter protection converter functionality control circuitry. Beyond protection, desirable inverter or other operating conditions can be achieved by the converter, thus embodiments may include photovoltaic inverter operating condition converter functionality control circuitry. These may be simply coordinated in some manner such as by a photovoltaic inverter or posterior element coordinated modality or photovoltaic inverter or posterior element coordinated converter functionality control circuitry. There may also be embodiments that have small output voltage (even within an allowed output voltage range). This may accommodate an inverter with a small energy storage capacitor. The output voltage may even be coordinated with an inverter's energy storage capability.

Figure 9:
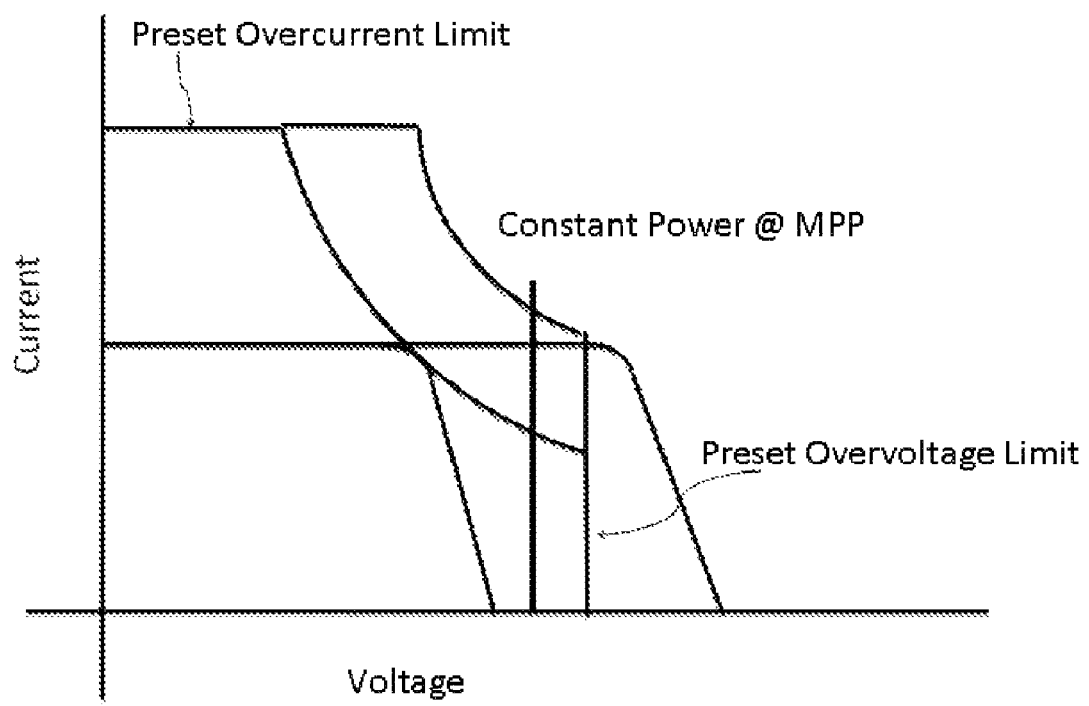
FIG. 9 shows a plot of combined protective and coordinated process conditions according to one operational embodiment of the invention.

As illustrated in FIGS. 7A, 7B, and 9, boundary conditions or safety limits may be set such as the overcurrent limit and the overvoltage limit. Thus the converter and/or its control circuitry may serve as a safety module or photovoltaic boundary condition converter functionality control circuitry, may achieve a photovoltaic boundary condition modality of photovoltaic DC-DC power conversion, and may accomplish the step of controlling a photovoltaic boundary condition of the photovoltaic DC-DC converter.

Yet another mode of operation may be to make a value proportional (in its broadest sense) to some other aspect. For example, there can be advantages to making voltage proportional to current such as to provide soft start capability or the like. Thus embodiments may be configured for controlling a maximum photovoltaic output voltage proportional to a photovoltaic output current at least some times during the process of converting a DC input to a DC output. In general, this may provide soft transition photovoltaic power conversion control circuitry or portion. And the system may include duty cycle control or switch operation that can be conducted so as to achieve one or more proportionalities between maximum voltage output and current output or the like. Further, not only can any of the above by combined with any other of the above, but each may be provided in a slaved manner such that consideration of one modality is secondary to that of another modality.

A variety of results have been described above. These may be achieved by simply altering the duty cycle of or switches affected by the switches. These can be accomplished based on preset or predetermined thresholds and so provide threshold triggered alternative mode, threshold determinative, threshold activation, or threshold deactivation switching photovoltaic power conversion control circuitry. A burst mode of operation perhaps such as when nearing a mode alteration level of operation may be provided and at such times frequency can be halved, opposing modes can be both alternated, and level can be reduced as a change become incipient. This can be transient as well. In these manners burst mode switching photovoltaic power conversion control circuitry and burst mode switching can be accomplished, as well as transient opposition mode photovoltaic duty cycle switch control circuitry and the step of transiently establishing opposing switching modes.

As mentioned above, the PCs and photovoltaic DC-DC power converters (4) may handle individual panels. They may be attached to a panel, to a frame, or separate. Embodiments may have converters physically integral to such panels in the sense that they are provided as one attached unit or junction box for ultimate installation. This can be desirable such as when there are independent operating conditions for separate solar sources, and even adjacent solar sources to accommodate variations in available insolation, condition, or otherwise. Each panel or the like may achieve its own MPP, and may coordinate protection with all others in a string or the like.

Figure 10:
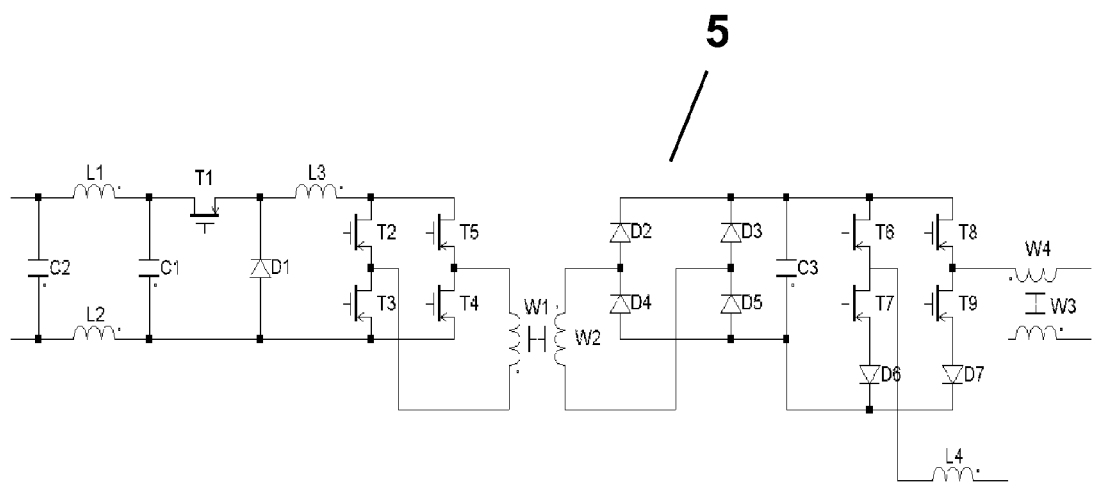
FIG. 10 shows a prior art system with a grid-tied inverter.

FIG. 10 illustrate one type of photovoltaic DC-AC inverter (5) that may be used. Naturally as may be appreciated from the earlier comments enhanced inverters that need not control MPP and that are alternatively protected by the converter may be used. Inverters may even have a separate control input or module or control part so that the input voltage or current to this power supplier is monitored and maintained at a most optimal or predetermined level, perhaps such as a singular sweet spot or the like as illustrated by the bold vertical line in FIG. 9. Although other inventions by the present assignee address such aspects, they may be considered incidental to the converter invention described here. Thus a more traditional inverter is shown in FIG. 10. This may provide a connection to some type of AC power grid interface (9).

As the invention becomes more accepted it may be advantageous to permit comparison with more traditional technologies. This can be achieved by simple switch operation whereby traditional modes of operation can be duplicated or perhaps adequately mimicked. Thus embodiments may include a solar power conversion comparator (29) that can compare first and second modes of operation, perhaps the improved mode of an embodiment of the present invention and a traditional, less efficient mode. This comparator may involve indicating some solar energy parameter for each. In this regard, the shunt switch operation disable element or regulator may be helpful. From this a variety of difference can be indicated, perhaps: solar power output, solar power efficiency differences, solar power cost differences, solar power insolation utilization comparisons, and the like.

By the above combinations of these concepts and circuitry, at least some of the following benefits may be realized:

Every PV panel may produce its individual maximum power. Many estimates today indicate this may increase the power generated in a PV installation by 20% or even more.

The grid tied inverter may be greatly simplified and operate more efficiently.

The Balance of System costs for a PV installation may be reduced.

The circuitry, concepts and methods of various embodiments of the invention may be broadly applied. It may be that one or more PCs per panel may be used. For example there may be non-uniformities on a single panel or other reasons for harvesting power from even portions of a panel. It may be for example that small power converters may be used on panel segments optimizing the power which may be extracted from a panel. This invention is explicitly stated to include sub panel applications.

This invention may be optimally applied to strings of panels. It may be more economical for example to simply use a PC to interconnect or for each or a string of panels in a larger installation, whereby the PC could serve as a mechanism to connect or interconnect panels or the like. This could be internal and particularly beneficial in parallel connected strings if one string was not able to produce much power into the voltage the remainder of the strings is producing. In this case one PC per string may increase the power harvested from a large installation and would provide an interconnected DC power source output.

This invention is assumed to include many physical installation options. For example there may be a hard physical connection or attachment mechanism between the PC and a panel. There may be an interconnection box for strings in which a PC per string may be installed. A given panel may have one or more PCs incorporated into the panel. A PC may also be a stand-alone physical entity.

All of the foregoing is discussed in the context of a solar power application. As may be appreciated, some if not all aspects may be applied in other contexts as well. Thus, this disclosure should be understood as supporting other applications of the converter regardless how applied and even whether applied as a power converter, impedance converter, voltage converter, or otherwise.

As can be easily understood from the foregoing, the basic concepts of the present invention may be embodied in a variety of ways. It involves both solar power generation techniques as well as devices to accomplish the appropriate power generation. In this application, the power generation techniques are disclosed as part of the results shown to be achieved by the various circuits and devices described and as steps which are inherent to utilization. They are simply the natural result of utilizing the devices and circuits as intended and described. In addition, while some circuits are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the devices and circuits described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "converter" should be understood to encompass disclosure of the act of "converting"—whether explicitly discussed or not—and, conversely, were there effectively disclosure of the act of "converting", such a disclosure should be understood to encompass disclosure of a "converter" and even a "means for converting" Such changes and alternative terms are to be understood to be explicitly included in the description.

Any patents, publications, or other references mentioned in this application for patent or its list of references are hereby incorporated by reference. Any priority case(s) claimed at any time by this or any subsequent application are hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the List of References other information statement filed with or included in the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

LIST OF REFERENCES

I. U.S. PATENT DOCUMENTS

| DOCUMENT NO. & KIND CODE (if known) | PUB'N DATE mm-dd-yyyy | PATENTEE OR APPLICANT NAME |
|---|---|---|
| 4,127,797 | 11-28-1978 | Perper |
| 4,375,662 | 03-01-1983 | Baker |
| 4,390,940 | 06-28-1983 | Corbefin et al. |
| 4,404,472 | 09-13-1983 | Steigerwald |
| 4,445,049 | 04-24-1984 | Steigerwald |
| 4,626,983 | 12-02-1986 | Harada et al. |
| 4,725,740 | 02-16-1988 | Nakata |
| 5,027,051 | 06-25-1991 | Lafferty |
| 5,747,967 | 05-05-1998 | Muljadi et al. |
| 6,081,104 | 06-27-2000 | Kern |
| 6,281,485 | 08-28-2001 | Siri |
| 6,282,104 | 08-28-2001 | Kern |
| 6,351,400 | 02-26-2002 | Lumsden |
| 6,369,462 | 04-09-2002 | Siri |
| 6,448,489 | 09-10-2002 | Kimura et al. |
| 6,791,024 | 09-14-2004 | Toyomura |
| 6,889,122 | 05-03-2005 | Perez |
| 6,914,418 | 07-05-2005 | Sung |
| 7,091,707 | 08-15-2006 | Cutler |
| 7,158,395 | 01-02-2007 | Deng et al. |
| 7,227,278 | 06-05-2007 | Realmuto et al. |

-continued

LIST OF REFERENCES

| | | |
|---|---|---|
| 7,274,975 | 09-25-2007 | Miller |
| 2005002214A1 | 01/06/2005 | Deng et al. |
| 2005068012A1 | 03/31/2005 | Cutler |
| 2005162018A1 | 07/28/2005 | Realmuto et al. |
| 2006103360A9 | 05/18/2006 | Cutler |
| 2006174939A1 | 08/10/2006 | Matan |
| 2007035975A1 | 02/15/2007 | Dickerson et al. |
| 20010007522 A1 | 07-12-2001 | Nakagawa et al. |
| 20030111103 A1 | 06-19-2003 | Bower et al. |
| 20070069520 A1 | 03-29-2007 | Schetters |
| 20070133241 A1 | 06-14-2007 | Mumtaz et al. |
| 199105027051 | 02/25/1991 | Laffferty |
| 200106281485 | 08/28/2001 | Siri |
| 200206369462 | 04/09/2002 | Siri |
| 200707158395 | 01/02/2007 | Deng et al |
| 200707227278 | 06/05/2007 | Realmuto et al. |

II. FOREIGN PATENT DOCUMENTS

| Foreign Patent Document | PUB'N DATE | PATENTEE OR APPLICANT NAME |
|---|---|---|
| WO 2004100344 A2 | Nov. 18, 2004 | Ballard Power Systems Corporation |
| WO 2004100348 A1 | Nov. 18, 2004 | Encesys Limited |
| WO 2005027300 A1 | Mar. 24, 2005 | Solarit AB |
| WO 2005036725 A1 | Apr. 21, 2005 | Konin-Klijke Philips Electronics |
| WO 2006005125 A1 | Jan. 19, 2006 | Central Queensland University et al. |
| WO 20060071436 A2 | Jul. 06, 2006 | ISG Technologies, LLC |
| WO 2006013600 A2 | Feb. 09, 2006 | Universita Degli Studi DiRoma "La Sapienza" |
| WO 2006013600 A3 | Feb. 09, 2006 | Universita Degli Studi DiRoma "La Sapienza" |
| WO 2006048688 A2 | May 11, 2006 | Encesys Limited |
| WO 2006048689 A2 | May 11, 2006 | Encesys Limited |
| WO 2006048689 A3 | May 11, 2006 | Encesys Limited |
| WO 2006137948 A2 | Dec. 28, 2006 | ISG Technologies, LLC |
| WO 2007007360 A2 | Jan. 18, 2007 | Universita Degli Studi Di Salerno |
| WO 2007080429 A2 | Jul. 19, 2007 | Encesys Limited |
| JP 198762154121A2 | | Kyogera Corp |
| EP 0964415 A1 | Dec. 15, 1999 | Igarashi, Katsuhiko-TDK Corp |
| EP 0780750 B1 | Mar. 27, 2002 | Nakata, et al. |
| EP 1120895 A3 | May 06, 2004 | Murata Manufacturing Co, et al. |
| EP 0964415 A1 | Dec. 15, 1999 | TDK Corp, et al. |
| GB 2434490 A | Jul. 25, 2007 | Enecsys Limited, et al. |
| GB 2421847 A | Jul. 05, 2006 | Enecsys Limited, et al. |
| GB 2419968 A | May 10, 2006 | Enecsys Limited, et al. |
| GB 2415841 A | Jan. 04, 2006 | Enecsys Limited, et al. |
| GB 612859 | Nov. 18, 1948 | Statndard Telephones and Cables Limited |
| DE 310,362 | Sep. 26, 1929 | Rheinishce Metallwaaren-Und Maschinenfabrik Sommerda Aktien-Gesellschaft |
| JP 2002231578 A | Aug. 16, 2002 | Meidensha Corp |
| JP 2000020150 A | Jan. 21, 2000 | Toshiba Fa Syst Eng Corp, et al. |
| JP 08066050 A | Mar. 08, 1996 | Hitachi Ltd |
| JP 08033347 A | Feb. 02, 1996 | Hitachi Ltd, et al. |
| JP 07222436 A | Aug. 18, 1995 | Meidensha Corp |
| JP 05003678 A | Jan. 08, 1993 | Toshiba F EE Syst KK, et al. |

-continued

LIST OF REFERENCES

III. NON-PATENT LITERATURE DOCUMENTS

Northern Arizona Wind & Sun; solar-electric.com; All about MPPT Solar Charge Controllers; Nov. 5, 2007

SatCon Power Systems, PowerGate Photovoltaic 50 kW Power Converter System, June 2004

Bower, et al. Innovative PV Micro-Inverter Topology Eliminates Electrolytic Capacitors for Longer Lifetime, 1-4244-0016-3/06 IEEE p. 2038

Gene Z. Guo, Design of a 400 W, 1Φ. Buck-Boost Inverter for PV Applications. 32. nd. Annual Canadian Solar Energy Conference Jun. 10, 2007

Hua, C. et al., Control of DC/DC converters for solar energy system with maximum power tracking, Department of Electrical Engineering; National Yumin University of Science & Technology, Taiwan, Volume 2, Issue, 9-14 Nov. 1997 Page(s): 827-832

Kang, F. et al., Photovoltaic power interface circuit incorporated with a buck-boost converter and a full-bridge inverter; doi: 10.1016/j.apenergy.2004.10.009

Kretschmar K., et al. An AC converter with a small DC link capacitor for a 15 kW permanent magnet synchronous integral motor, Power Electronics and Variable Speed Drives, 1998. Seventh International Conference on (Conf. Publ. No. 456) Volume, Issue, 21-23 Sep. 1998 Page(s): 622-625

Lim, Y. H. et al., Simple maximum power point tracker for photovoltaic arrays, Electronics Letters May 25, 2000 Vol. 36, No. 11

Matsuo, H. et al., Novel solar cell power supply system using the multiple-input DC-DC converter, Telecommunications Energy Conference, 1998. INTELEC. Twentieth International, Volume, Issue, 1998 Page(s): 797-8022

Roman, E. et al. Intelligent PV Module for Grid-Connected PV Systems, IEEE Transactions of Power Electronics, Vol. 53. No. 4 August 2006

Takahashi, I. et al. Development of a long-life three-phase flywheel UPS using an electrolytic capacitorless converter/inverter, 1999 Scripta Technica, Electr. Eng. Jpn, 127(3): 25-32

Walker, G. R. et al, Cascaded DC-DC Converter Connection of Photovoltaic Modules, IEEE Transactions of Power Electronics, Vol. 19. No. 4 July 2004

Walker, G. R. et al., "PV String Per-Module Power Point Enabling Converters," School of Information Technology and Electrical Engineering, The University of Queensland, presented at the Australasian Universities Power Engineering Conference, AUPEC2003, Christchurch, Sep. 28-Oct. 1, 2003.

Hashimoto, et al. A Novel High Performance Utility Interactive Photovoltaic Inverter System, Department of Electrical Engineering, Tokyo Metropolitan University, 1-1 Minami-Osawa, Hachioji, Tokyo, 192-0397, Japan, p. 2255

Shimizu, et al. Generation Control Circuit for Photovoltaic Modules, EII Transactions on Power Electronics, Vol 16, No. 3, May 2001

United States Provisional Application filed Oct. 15, 2007, Ser. Number 60/980,157

United States Provisional Application filed Oct. 23, 2007, Ser. Number 60/982,053

United States Provisional Application filed Nov. 15, 2007, Ser. Number 60/986,979

Thus, the applicant(s) should be understood to have support to claim and make a statement of invention to at least: i) each of the power source devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein. In addition and as to computerized aspects and each aspect amenable to programming or other programmable electronic automation, the applicant(s) should be understood to have support to claim and make a statement of invention to at least: xiv) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. Both the examiner and any person otherwise interested in existing or later potential coverage, or considering if there has at any time been any possibility of an indication of disclaimer or surrender of potential coverage, should be aware that in the absence of explicit statements, no such surrender or disclaimer is intended or should be considered as existing in this or any subsequent application. Limitations such as arose in *Hakim v. Cannon Avent Group, PLC*, 479 F.3d 1313 (Fed. Cir 2007), or the like are expressly not intended in this or any subsequent related matter.

In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An efficient solar energy power system comprising:
    a plurality of solar panels, each said solar panel having a DC photovoltaic output;
    a DC photovoltaic input that accepts power from said DC photovoltaic output;
    at least one substantially power isomorphic photovoltaic DC-DC power converter responsive to at least one said DC photovoltaic input;
    substantially power isomorphic maximum photovoltaic power point converter multimodal functionality control circuitry to which said at least one substantially power isomorphic photovoltaic DC-DC power converter is responsive;
    a converted photovoltaic DC power output connected to said at least one substantially power isomorphic photovoltaic DC-DC power converter;
    at least one photovoltaic DC-AC inverter responsive to said photovoltaic DC power output; and
    a photovoltaic AC power output responsive to said at least one photovoltaic DC-AC inverter.

2. An efficient solar energy power system as described in claim 1 wherein said plurality of solar panels comprises a string of solar panels; and wherein said substantially power isomorphic maximum photovoltaic power point converter multimodal functionality control circuitry comprises a panel dedicated substantially power isomorphic maximum photovoltaic power point converter multimodal functionality control circuitry.

3. An efficient solar energy power system as described in claim 1 wherein said substantially power isomorphic maximum photovoltaic power point converter multimodal functionality control circuitry to which said at least one substantially power isomorphic photovoltaic DC-DC power converter is responsive comprises a substantially power isomorphic maximum photovoltaic power point converter dual mode functionality control circuitry to which said at least one substantially power isomorphic photovoltaic DC-DC power converter is responsive.

4. An efficient solar energy power system as described in claim 1 and further comprising photovoltaic boundary condition converter functionality control circuitry.

5. An efficient solar energy power system as described in claim 1 wherein said substantially power isomorphic maximum photovoltaic power point converter multimodal functionality control circuitry is selected from a group consisting of:
- at least about 98% efficient photovoltaic conversion circuitry,
- at least about 98.5% efficient photovoltaic conversion circuitry,
- at least about 98% up to about 99.2% efficient photovoltaic conversion circuitry,
- at least about 98.5% up to about 99.2% efficient photovoltaic conversion circuitry,
- at least about 98% up to about wire transmission loss efficient photovoltaic conversion circuitry, and
- at least about 98.5% up to about wire transmission loss efficient photovoltaic conversion circuitry.

6. An efficient solar energy power system as described in claim 1 wherein said substantially power isomorphic maximum photovoltaic power point converter multimodal functionality control circuitry comprises substantially power isomorphic maximum photovoltaic power point converter multimodal functionality control circuitry selected from a group consisting of:
- alternative mode photovoltaic power converter functionality control circuitry;
- photovoltaic impedance transformation power conversion control circuitry;
- maximum photovoltaic inverter current converter functionality control circuitry;
- maximum photovoltaic power point converter functionality control circuitry;
- photovoltaic inverter operating condition converter functionality control circuitry;
- both photovoltaic load impedance increase converter functionality control circuitry and photovoltaic load impedance decrease converter functionality control circuitry;
- slaved maximum photovoltaic power point converter functionality control circuitry;
- slaved photovoltaic inverter operating condition converter functionality control circuitry;
- slaved photovoltaic load impedance increase converter functionality control circuitry;
- slaved photovoltaic load impedance decrease converter functionality control circuitry;
- both slaved photovoltaic load impedance increase converter functionality control circuitry and slaved photovoltaic load impedance decrease converter functionality control circuitry;
- photovoltaic boundary condition converter functionality control circuitry;
- posterior photovoltaic element protection converter functionality control circuitry;
- photovoltaic inverter protection converter functionality control circuitry;
- photovoltaic inverter coordinated converter functionality control circuitry;
- maximum photovoltaic inverter current converter functionality control circuitry;
- slaved photovoltaic voltage increase and photovoltaic voltage decrease maximum photovoltaic power point converter functionality control circuitry;
- maximum photovoltaic inverter input voltage photovoltaic converter output voltage functionality control circuitry;
- multimodal converter functionality control circuitry;
- alternative mode photovoltaic power converter functionality control circuitry configured to alternatively switch at least some times between first modality photovoltaic DC-DC power conversion circuitry and second modality photovoltaic DC-DC power conversion circuitry;
- both photovoltaic load impedance increase converter functionality control circuitry and photovoltaic load impedance decrease converter functionality control circuitry;
- photovoltaic boundary condition converter functionality control circuitry;
- posterior photovoltaic operating condition converter functionality control circuitry;
- posterior photovoltaic element protection converter functionality control circuitry;
- substantially power isomorphic photovoltaic converter functionality control circuitry;
- photovoltaic disable mode converter functionality control circuitry;
- photovoltaic inverter protection converter functionality control circuitry;
- photovoltaic inverter coordinated converter functionality control circuitry;
- photovoltaic slaved mode converter functionality control circuitry;
- photovoltaic inverter slaved converter functionality control circuitry;
- photovoltaic duty cycle switch control circuitry;
- threshold determinative switching photovoltaic power conversion control circuitry;
- switch frequency alteration switching photovoltaic power conversion control circuitry;
- burst mode switching photovoltaic power conversion control circuitry;
- transient opposition mode photovoltaic duty cycle switch control circuitry;
- first modality control circuitry;
- burst mode control circuitry operated for occasional bursts of a particular duty cycle level for mode transition of said photovoltaic DC-DC converter between a first modality of photovoltaic DC-DC power conversion and a second modality of photovoltaic DC-DC power conversion;
- transient opposition mode control circuitry; and
- all permutations and combinations of each of the above.

7. An efficient solar energy power system as described in claim 1 and further comprising an element selected from a group consisting of:
- a conversion operation switch that switches operation between a first modality photovoltaic DC-DC power conversion circuitry and a second modality photovoltaic DC-DC power conversion circuitry; and
- a shunt switch operation disable element to bypass at least one modality of photovoltaic DC-DC power conversion circuitry at least some times.

8. An efficient solar energy power system as described in claim 1 and further comprising a junction box.

9. An efficient solar energy power system as described in claim 8 wherein said junction box comprises said at least one substantially power isomorphic photovoltaic DC-DC power converter physically integral to an individual solar panel.

10. An efficient solar energy power system as described in claim 1 wherein said at least one substantially power isomorphic photovoltaic DC-DC power converter is selected from a group consisting of:
- at least one individual panel dedicated substantially power isomorphic photovoltaic DC-DC power converter; and
- at least one multiple panel dedicated substantially power isomorphic photovoltaic DC-DC power converter.

11. An efficient solar energy power system as described in claim 10 and further comprising an element selected from a group consisting of:
- a string of said plurality of solar panels connected to said at least one substantially power isomorphic photovoltaic DC-DC power converter, wherein said string of said plurality of solar panels is selected from a group consisting of 10 solar panels, 8 solar panels, 4 solar panels, 3 solar panels, and 2 solar panels;
- at least one series string multiple panel dedicated substantially power isomorphic photovoltaic DC-DC power converter; and
- a string of said plurality of solar panels selected from a group consisting of 10 solar panels, 8 solar panels, 4 solar panels, 3 solar panels, and 2 solar panels.

12. An efficient solar energy power system as described in claim 1 and further comprising an interconnection box for a plurality of said DC photovoltaic outputs.

13. An efficient solar energy power system as described in claim 12 and further comprising an electrical connection between at least one of said plurality of solar panels and said interconnection box, wherein said at least one of said plurality of solar panels is selected from a group consisting of 10 solar panels, 8 solar panels, 4 solar panels, 3 solar panels, and 2 solar panels.

14. An efficient solar energy power system as described in claim 1 and further comprising a solar power conversion operation switch that switches operation between a first power capability and a second power capability.

15. An efficient solar energy power system as described in claim 14 wherein said first power capability comprises a traditional power conversion capability and wherein said second power capability comprises an improved power conversion capability.

16. An efficient solar energy power system as described in claim 15 and further comprising a shunt switch operation disable element to bypass said improved power conversion capability.

17. An efficient solar energy power system comprising:
- a plurality of solar panels, each said solar panel having a DC photovoltaic output;
- a DC photovoltaic input that accepts power from said DC photovoltaic output;
- first modality photovoltaic DC-DC power conversion circuitry responsive to said DC photovoltaic input;
- second modality photovoltaic DC-DC power conversion circuitry responsive to said DC photovoltaic input;
- at least one photovoltaic DC-DC power converter responsive to at least one said DC photovoltaic input;
- high efficiency multimodal converter functionality control circuitry to which said at least one photovoltaic DC-DC power converter is responsive and wherein said high efficiency multimodal converter functionality control circuitry is configured to switch at least some times between said first modality photovoltaic DC-DC power conversion circuitry and said second modality photovoltaic DC-DC power conversion circuitry;
- a converted photovoltaic DC power output connected to said at least one photovoltaic DC-DC power converter;
- at least one photovoltaic DC-AC inverter responsive to said photovoltaic DC power output; and
- a photovoltaic AC power output responsive to said at least one photovoltaic DC-AC inverter.

18. An efficient solar energy power system as described in claim 17 wherein said high efficiency multimodal converter functionality control circuitry comprises substantially power isomorphic photovoltaic converter functionality control circuitry.

19. An efficient solar energy power system as described in claim 18 wherein said substantially power isomorphic photovoltaic converter functionality control circuitry is selected from a group consisting of:
- at least about 98% efficient photovoltaic conversion circuitry,
- at least about 98.5% efficient photovoltaic conversion circuitry,
- at least about 98% up to about 99.2% efficient photovoltaic conversion circuitry,
- at least about 98.5% up to about 99.2% efficient photovoltaic conversion circuitry,
- at least about 98% up to about wire transmission loss efficient photovoltaic conversion circuitry, and
- at least about 98.5% up to about wire transmission loss efficient photovoltaic conversion circuitry.

20. An efficient solar energy power system comprising:
- at least one string of a plurality solar panels, at least one of said solar panels having a DC photovoltaic output;
- a DC photovoltaic input that accepts power from said DC photovoltaic output;
- at least one multiple panel dedicated substantially power maximum photovoltaic power point DC-DC power converter responsive to at least one said DC photovoltaic input;
- maximum photovoltaic power point converter multimodal functionality control circuitry to which said at least one multiple panel dedicated substantially power maximum photovoltaic power point DC-DC power converter is responsive;
- a converted photovoltaic DC power output connected to said at least one multiple panel dedicated substantially power maximum photovoltaic power point DC-DC power converter;
- at least one photovoltaic DC-AC inverter responsive to said photovoltaic DC power output; and
- a photovoltaic AC power output responsive to said at least one photovoltaic DC-AC inverter.

21. An efficient solar energy power system as described in claim 17 or 20 wherein said converter functionality control circuitry comprises converter functionality control circuitry selected from a group consisting of:
- alternative mode photovoltaic power converter functionality control circuitry;
- photovoltaic impedance transformation power conversion control circuitry;
- maximum photovoltaic inverter current converter functionality control circuitry;
- maximum photovoltaic power point converter functionality control circuitry;
- photovoltaic inverter operating condition converter functionality control circuitry;
- both photovoltaic load impedance increase converter functionality control circuitry and photovoltaic load impedance decrease converter functionality control circuitry;
- slaved maximum photovoltaic power point converter functionality control circuitry;
- slaved photovoltaic inverter operating condition converter functionality control circuitry;
- slaved photovoltaic load impedance increase converter functionality control circuitry;
- slaved photovoltaic load impedance decrease converter functionality control circuitry;
- both slaved photovoltaic load impedance increase converter functionality control circuitry and slaved photovoltaic load impedance decrease converter functionality control circuitry;
- photovoltaic boundary condition converter functionality control circuitry;
- posterior photovoltaic element protection converter functionality control circuitry;
- photovoltaic inverter protection converter functionality control circuitry;
- photovoltaic inverter coordinated converter functionality control circuitry;
- maximum photovoltaic inverter current converter functionality control circuitry;
- slaved photovoltaic voltage increase and photovoltaic voltage decrease maximum photovoltaic power point converter functionality control circuitry;
- maximum photovoltaic inverter input voltage photovoltaic converter output voltage functionality control circuitry;
- multimodal converter functionality control circuitry;
- alternative mode photovoltaic power converter functionality control circuitry configured to alternatively switch at least some times between first modality photovoltaic DC-DC power conversion circuitry and second modality photovoltaic DC-DC power conversion circuitry;
- both photovoltaic load impedance increase converter functionality control circuitry and photovoltaic load impedance decrease converter functionality control circuitry;
- photovoltaic boundary condition converter functionality control circuitry;
- posterior photovoltaic operating condition converter functionality control circuitry;
- posterior photovoltaic element protection converter functionality control circuitry;
- substantially power isomorphic photovoltaic converter functionality control circuitry;
- photovoltaic disable mode converter functionality control circuitry;
- photovoltaic inverter protection converter functionality control circuitry;
- photovoltaic inverter coordinated converter functionality control circuitry;
- photovoltaic slaved mode converter functionality control circuitry;
- photovoltaic inverter slaved converter functionality control circuitry;
- photovoltaic duty cycle switch control circuitry;
- threshold determinative switching photovoltaic power conversion control circuitry;
- switch frequency alteration switching photovoltaic power conversion control circuitry;
- burst mode switching photovoltaic power conversion control circuitry;
- transient opposition mode photovoltaic duty cycle switch control circuitry;
- first modality control circuitry;
- burst mode control circuitry operated for occasional bursts of a particular duty cycle level for mode transition of said photovoltaic DC-DC converter between a first modality of photovoltaic DC-DC power conversion and a second modality of photovoltaic DC-DC power conversion;
- transient opposition mode control circuitry; and
- all permutations and combinations of each of the above.

22. An efficient solar energy power system as described in claim 17 or 20 and further comprising an element selected from a group consisting of:
- a conversion operation switch that switches operation between a first modality photovoltaic DC-DC power conversion circuitry and a second modality photovoltaic DC-DC power conversion circuitry; and
- a shunt switch operation disable element to bypass at least one modality of photovoltaic DC-DC power conversion circuitry at least some times.

23. An efficient solar energy power system as described in claim 17 or 20 and further comprising a junction box.

24. An efficient solar energy power system as described in claim 23 wherein said junction box comprises said at least one substantially power isomorphic photovoltaic DC-DC power converter physically integral to an individual solar panel.

25. An efficient solar energy power system as described in claim 17 wherein said at least one photovoltaic DC-DC power converter is selected from a group consisting of:
- at least one individual panel dedicated substantially power isomorphic photovoltaic DC-DC power converter; and
- at least one multiple panel dedicated substantially power isomorphic photovoltaic DC-DC power converter.

26. An efficient solar energy power system as described in claim 20 wherein said at least one multiple panel dedicated substantially power maximum photovoltaic power point DC-DC power converter comprises at least one multiple panel dedicated substantially power isomorphic photovoltaic DC-DC power converter.

27. An efficient solar energy power system as described in claim 25 or 26 and further comprising an element selected from a group consisting of:
- a string of said plurality of solar panels connected to said at least one substantially power isomorphic photovoltaic DC-DC power converter, wherein said string of said plurality of solar panels is selected from a group consisting of 10 solar panels, 8 solar panels, 4 solar panels, 3 solar panels, and 2 solar panels;
- at least one series string multiple panel dedicated substantially power isomorphic photovoltaic DC-DC power converter; and
- a string of said plurality of solar panels selected from a group consisting of 10 solar panels, 8 solar panels, 4 solar panels, 3 solar panels, and 2 solar panels.

28. An efficient solar energy power system as described in claim 17 or 20 and further comprising an interconnection box for a plurality of said DC photovoltaic outputs.

29. An efficient solar energy power system as described in claim 28 and further comprising an electrical connection between at least one of said plurality of solar panels and said interconnection box, wherein said at least one of said plurality of solar panels is selected from a group consisting of 10 solar panels, 8 solar panels, 4 solar panels, 3 solar panels, and 2 solar panels.

* * * * *